(12) United States Patent
Lee et al.

(10) Patent No.: US 12,519,875 B2
(45) Date of Patent: Jan. 6, 2026

(54) MOBILE TERMINAL

(71) Applicant: LG ELECTRONICS INC., Seoul (KR)

(72) Inventors: Hyukjae Lee, Seoul (KR); Joonhee Yoo, Seoul (KR); Jonghwan Lee, Seoul (KR); Soheon Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 322 days.

(21) Appl. No.: 18/279,372

(22) PCT Filed: Mar. 3, 2021

(86) PCT No.: PCT/KR2021/002609
§ 371 (c)(1),
(2) Date: Aug. 29, 2023

(87) PCT Pub. No.: WO2022/186400
PCT Pub. Date: Sep. 9, 2022

(65) Prior Publication Data
US 2024/0195896 A1 Jun. 13, 2024

(51) Int. Cl.
*H04M 1/02* (2006.01)
*H01Q 1/24* (2006.01)
*H04M 1/03* (2006.01)

(52) U.S. Cl.
CPC .......... *H04M 1/0237* (2013.01); *H01Q 1/243* (2013.01); *H04M 1/03* (2013.01); *H04M 1/026* (2013.01); *H04M 1/0268* (2013.01)

(58) Field of Classification Search
CPC .. H04M 1/0237; H04M 1/026; H04M 1/0268; H04M 1/03
See application file for complete search history.

(56) References Cited

U.S. PATENT DOCUMENTS 10,601,966 B2 * 3/2020 Fan ................. H04M 1/0264
10,868,264 B2 * 12/2020 Shin .................... H10K 59/40
(Continued)

FOREIGN PATENT DOCUMENTS

KR 1020160031363 3/2016
KR 1020170075693 7/2017
(Continued)

OTHER PUBLICATIONS

PCT International Application No. PCT/KR2021/002609, International Search Report dated Nov. 30, 2021, 13 pages.

*Primary Examiner* — Patrick F Marinelli
(74) *Attorney, Agent, or Firm* — LEE, HONG, DEGERMAN, KANG & WAIMEY

(57) ABSTRACT

The present disclosure relates to a mobile terminal comprising: a first frame in which a first substrate is mounted; a second frame which moves with respect to the first frame and in which a second substrate is mounted; a display part including a fixed portion which is coupled to the front surface of the first frame and a variable portion which extends from the fixed portion and is bent to the rear surface of the second frame while surrounding the second frame; an edge frame which covers the bent portion of the display part, is coupled to the second frame, and includes a microphone hole; a microphone module which is coupled to the inner surface of the edge frame and collects sounds through the microphone hole; and a flexible substrate which is disposed at the inner surface of the edge frame and has a connection terminal coupled at one end thereof to the microphone module and connected at the other end thereof to the second substrate.

8 Claims, 17 Drawing Sheets

(56) References Cited

U.S. PATENT DOCUMENTS

| | | | |
|---|---|---|---|
| 11,770,967 B2* | 9/2023 | Shin | G06F 3/041 |
| | | | 345/173 |
| 2015/0122853 A1* | 5/2015 | Kennard | H04B 1/3888 |
| | | | 224/191 |
| 2019/0305237 A1* | 10/2019 | Shin | G06F 3/0488 |
| 2021/0098723 A1* | 4/2021 | Shin | G06F 3/041 |
| 2022/0011830 A1* | 1/2022 | Sano | G06F 1/1652 |
| 2022/0312093 A1* | 9/2022 | Pang | H01Q 1/44 |
| 2023/0095163 A1* | 3/2023 | Chen | H04R 1/08 |
| | | | 455/566 |
| 2023/0141955 A1* | 5/2023 | Luo | H04R 1/028 |
| 2023/0261684 A1* | 8/2023 | Wu | H04M 1/03 |
| | | | 361/679.01 |
| 2024/0195896 A1* | 6/2024 | Lee | H04M 1/0237 |
| 2024/0195897 A1* | 6/2024 | Choi | G06F 1/1624 |
| 2024/0365053 A1* | 10/2024 | Wu | H04R 1/025 |
| 2024/0406625 A1* | 12/2024 | Ju | G06F 1/1688 |
| 2024/0430349 A1* | 12/2024 | Cho | G06F 1/1635 |

FOREIGN PATENT DOCUMENTS

| | | |
|---|---|---|
| KR | 1020190101184 | 8/2019 |
| KR | 1020190113128 | 10/2019 |

* cited by examiner (a)        (b)

(a)   (b)

(a)

(b)

(a)

(b)

(a)

(b)

(a)

(b)

(a)

(b)

MOBILE TERMINAL

CROSS-REFERENCE TO RELATED APPLICATION

This application is the National Stage filing under 35 U.S.C. 371 of International Application No. PCT/KR2021/002609, filed on Mar. 3, 2021, the contents of which are hereby incorporated by reference herein its entirety.

TECHNICAL FIELD

The present disclosure relates to a mobile terminal, and more particularly, to a mobile terminal that has a flexible display and is capable of extending a size of a screen while the display is scrolled and slid at the same time.

BACKGROUND

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

In order to implement various functions, an area of a display unit should be increased, but a size of a mobile terminal should be reduced considering its portability. In order to satisfy the two properties contrary to each other, a bezel located around the display unit was minimized to fill up a front side with the display unit.

Furthermore, there is a need for a mobile terminal that can be easily carried and used by changing a size of the mobile terminal in a manner of varying the size of the mobile terminal.

This trend is accelerating due to the recent emergence of a flexible display unit. However, it is necessary to solve the problem of deteriorating usability due to configuration that is different from the existing form factors.

DISCLOSURE

Technical Problem

A mobile terminal according to an embodiment of the present disclosure is proposed to solve the above problems. In other words, the present disclosure is to provide a structure that stably supports the extension of a display unit without sagging.

In addition, the present disclosure is to improve the quality of calls by disposing the microphone of the mobile terminal at the bottom center thereof.

Technical Solution

In an aspect of the present disclosure, there is provided a mobile terminal with a variable size. The mobile terminal includes: a first frame having mounted thereon a first substrate; a second frame having mounted thereon a second substrate and configured to move in a first direction with respect to the first frame or move in a second direction opposite to the first direction; a display unit including a curved portion, wherein the curved portion is configured to wrap around an end portion of the second frame in the first direction and bend to a rear; an edge frame including a microphone hole, wherein the edge frame is configured to cover the curved portion and coupled to the second frame in the first direction; a microphone module coupled to an inner surface of the edge frame and configured to collect sound through the microphone hole; and a flexible substrate positioned on the inner surface of the edge frame and provided with a connection terminal, wherein a first end of the connection terminal is coupled to the microphone module and a second end of the connection terminal is connected to the second substrate.

The first frame may be positioned above the second frame, and the first direction may be a downward direction.

The second frame may include a side portion located in a third direction perpendicular to the first direction, and the edge frame may include an extension portion that extends in the second direction to cover at least a portion of the side portion of the second frame. The mobile terminal may include a screw configured to fasten the extension portion of the edge frame and the side portion of the second frame.

The second substrate may be disposed adjacent to the side portion of the second frame, and the flexible substrate may be in contact with the second substrate inside the extension portion of the edge frame.

The edge frame may include a conductive member including a conductive material, and the second substrate may further include an antenna connection pin in contact with the conductive member.

The edge frame may include a non-conductive member positioned inside the conductive member, and the non-conductive member may further include a connection hole formed in the extension portion and configured to expose the conductive member.

The antenna connection pin may be disposed on the second substrate adjacent to the microphone connection pin in contact with the connection terminal.

The screw may include a pair of screws spaced apart in the first direction, and the antenna connection pin and the microphone connection pin may be positioned between the pair of screws.

Advantageous Effects

First of all, a mobile terminal according to one embodiment of the present disclosure may maintain a flat state of an extended display unit without deflection.

Secondly, as a mobile terminal is extended, since inner components are distributed instead of being concentrated on one side, displacement of center of gravity can be minimized. Since the center of gravity does not move upward, a user can stably use the mobile terminal in the extended state.

In addition, since a microphone may be positioned at the bottom center of the mobile terminal, it is possible to solve the problem that a microphone hole is covered when the user holds the mobile terminal.

Further, the bottom of the mobile terminal may be used to implement an antenna, thereby increasing the utilization of limited space.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions, or steps, disclosed in the specification, and it is also understood that greater or fewer components, functions, or steps may likewise be utilized.

Figure 1:
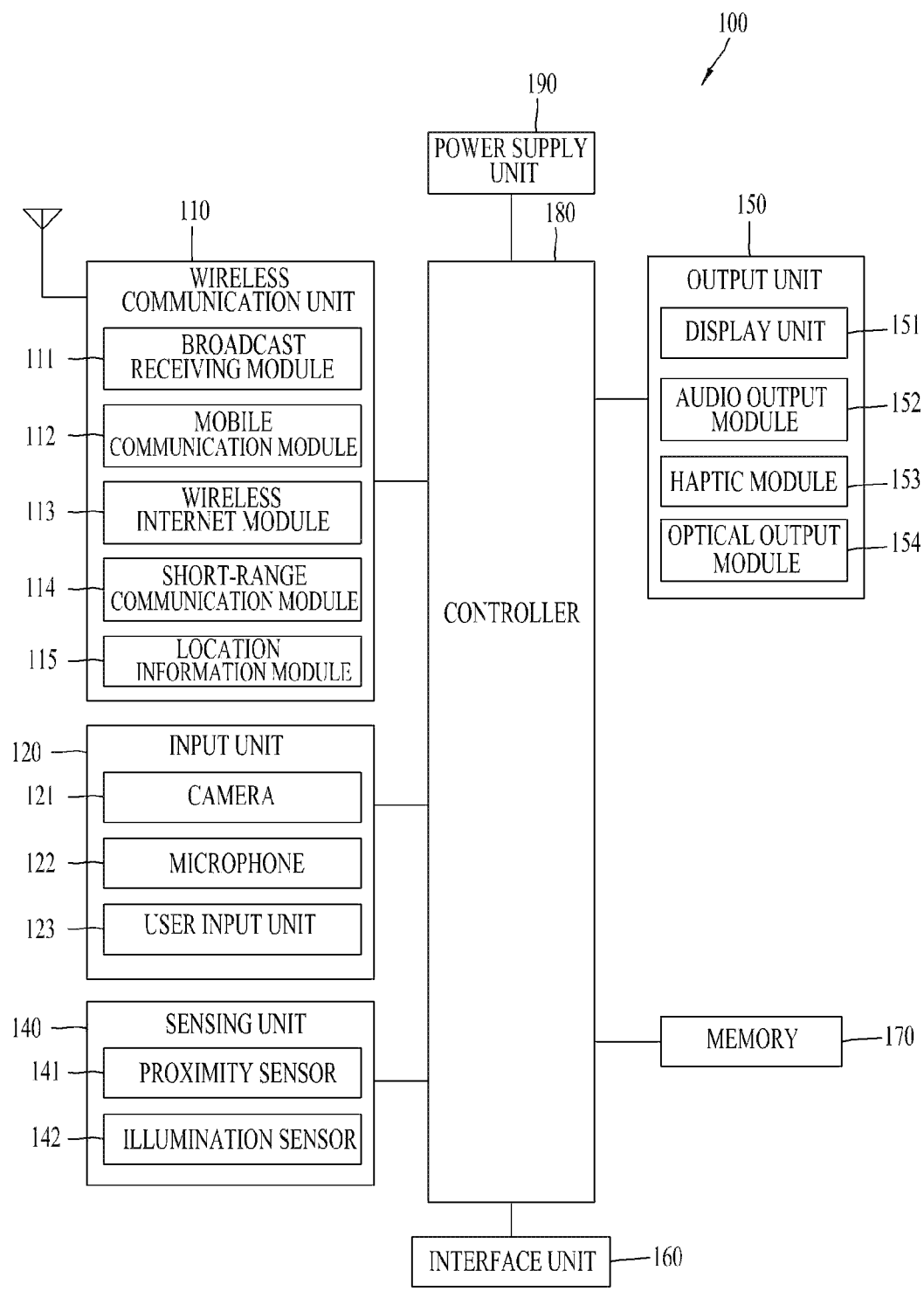
FIG. 1 is a block diagram of a mobile terminal in accordance with the present disclosure.

FIG. 1 is a block diagram of a mobile terminal in accordance with the present disclosure. The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A, and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive, or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information, and the like, which are input or output, or activating application programs stored in the memory 170.

To drive the application programs stored in the memory 170, the controller 180 may be implemented to control a predetermined number of the components mentioned above in reference to FIG. 1. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body or configured to be detachable from the terminal body.

Some or more of the components may be operated cooperatively to embody an operation, control, or a control method of the mobile terminal in accordance with embodiments of the present disclosure. Also, the operation, control or control method of the mobile terminal may be realized on the mobile terminal by driving of one or more application problems stored in the memory 170.

Figure 2:
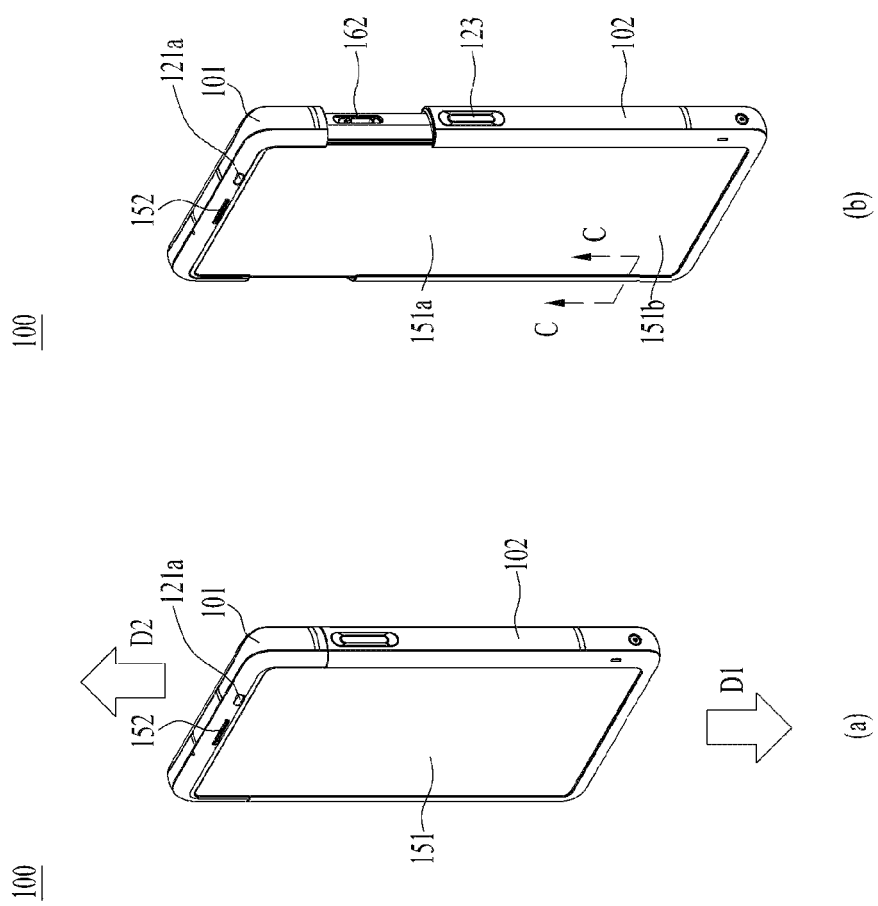
FIG. 2 is a front view of a first state and a second state of a mobile terminal.
Figure 3:
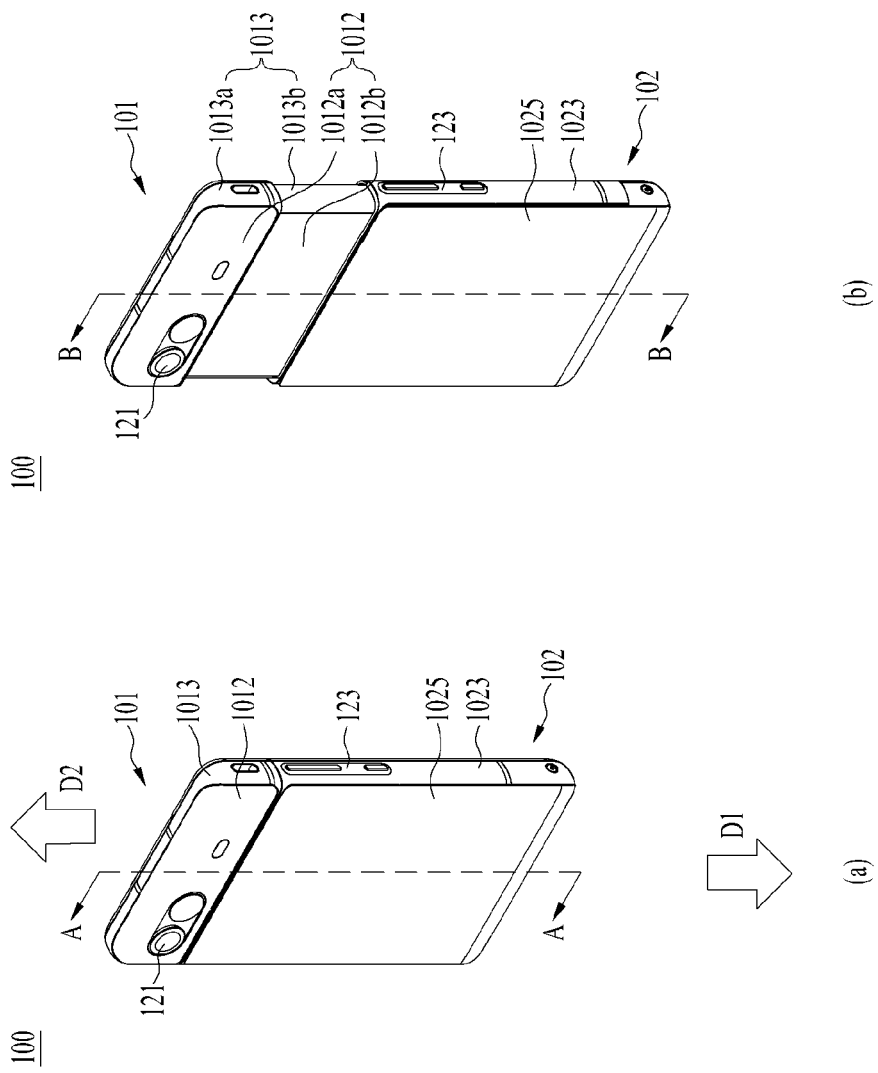
FIG. 3 is a rear view illustrating a first state and a second state of a mobile terminal.

FIGS. 2 and 3 are diagrams showing the mobile terminal 100 that may be varied in size. FIG. 2 is a front view of a first state and a second state of the mobile terminal 100, and FIG. 3 is a rear view illustrating the first state and the second state of the mobile terminal 100. The mobile terminal 100 includes frames 101 and 102 that slide such that the size of the mobile terminal 100 may be changed. A first frame 101 and a second frame 102 that slides relative to the first frame 101 are included. When the second frame 102 moves in a first direction D1, a state of the mobile terminal 100 is switched to an extended state (a second state). In addition, when the second frame 102 moves in a second direction opposite to the first direction, the state of the mobile terminal 100 is switched to a contracted state (a first state).

The movement of the second frame 102 is a movement relative to the first frame 101. If the second frame 102 becomes a reference, when the first frame 101 slides in the second direction D2, the mobile terminal 100 switches to the second state extended. When the first frame 101 slides in the first direction D1, the mobile terminal 100 switches to the first state contracted.

If the first frame 101 and the second frame 102 are disposed in top-bottom direction like the present embodiment, a user holds the second frame 102 located at the bottom, so the first frame 101 moves in top direction from the user's perspective. Hence, the mobile terminal 100 may be recognized as extended upward.

In the following description, the direction in which the mobile terminal 100 and the display unit 151 thereof are extended or enlarged is defined as a first direction, and the direction in which the mobile terminal contracts or retracts or is reduced to switch from the second state to the first state is defined as a second direction. A direction perpendicular to the first and second directions is defined as a third direction. Description will be made on the assumption that the first and second directions are horizontal directions and the third direction is a vertical direction. However, depending on the arrangement of the mobile terminal 100, the first and second directions may be vertical directions and the third direction may be a horizontal direction.

(a) in FIG. 2 and (a) in FIG. 3 show the first state that is the contracted state, and (b) in FIG. 2 and (b) in FIG. 3 show the second state that is the extended state. Even in the extended state switched as the second frame 102 moves in the first direction, the first frame 101 and the second frame 102 have an overlapping portion.

In the first state, one of the first frame 101 and the second frame 102 may be disposed to surround the other and be disposed outward of the other. The first frame 101 may be disposed outward of the second frame 102 in some embodiments, and the second frame 102 may be disposed outward of the first frame 101 in some embodiments.

In order to extend the mobile terminal 100 while the second frame 102 moves against the first frame 101, the first and second frames 101 and 102 partially overlap each other. At least one side of the first frame 101 and the second frame 102 may include a portion configured to remain inside in the contracted state of the mobile terminal 100 and be exposed externally in the extended state of the mobile terminal 100. A backside and lateral side of the mobile terminal 100 may include portions configured to be selectively exposed in part on switching to the second state or located inside of another member in the first state. In the present embodiment, the portion of the second frame exposed externally is fixed and the first frame 101 may include a portion always exposed externally and a portion selectively exposed.

As shown in FIG. 2(b), an extended front side of the mobile terminal in the second state extended is covered by the display unit 151 so that an inside of the mobile terminal 100 is not exposed.

An area of the display unit 151 located on the front side of the mobile terminal 100 may vary depending on whether the frame 101 and 102 of the mobile terminal 100 is extended. A front side area of the display unit 151 in the second state may have a size greater than that in the first state. The display unit 151 includes a fixed part 151a fixed to the front side of the first frame 101 so as to be always located on the front side of the mobile terminal irrespective of the state of the mobile terminal 100 and a variable part 151b located on the front side or the backside depending on whether the mobile terminal 100 is extended.

The fixed part 151a is always located on the front side by being coupled to the front side of the first frame 101 of the display unit151, thereby configuring a portion of the front part. As the fixed part 151a is fixed to the first frame 101, it is characterized in maintaining a uniform shape without changing flexibility. On the other hand, the variable part 151b means a portion at which an angle of a flexed portion varies or a portion at which a location of a flexed portion is changed. In the second state of the mobile terminal, as the variable part moves to a front side, the fixed part and the variable part simultaneously located at the front part.

The variable part 151b includes a lateral part located in a lateral direction of the mobile terminal 100, and a location of the lateral part varies depending on a location of the second frame 102. Based on the lateral part, a size of a region located on the front side and a size of a region located on the backside are changed. Some of the variable part 151b may become the front part or the backside part depending on the first or second state.

Based on the mobile terminal 100, the variable part 151b is located in the first direction to the fixed part 151a and an end portion of the variable part 151b is bent in a direction of the backside of the mobile terminal 100 and slides to move on the backside of the second frame 102.

The end portion of the variable part 151b of the display unit 151 is coupled with a slide frame 103 guiding to slide on the backside of the second frame 102, and the slide frame 103 moves on the second frame 102 in the first direction as soon as the second frame 102 moves in the first direction. Consequently, a moving distance of the slide frame 103 amounts to a distance twice longer for the first frame 101 in comparison to the second frame 102.

As such, a flexible display unit 151 which is bendable may be used as the display unit such that the position of the display unit may move to front side or rear side. The flexible display unit 151 may be a display unit capable of maintaining a flat state like a conventional flat panel display and capable of warping, bending, folding, twisting, or rolling like paper. The flexible display unit 151 refers to a display which is manufactured on a thin and flexible substrate and is thus lightweight and robust as not to be easily broken. The flexible display unit according to the present disclosure may be bent in a specific direction and may be arranged such that the curvature thereof may change in the first direction.

In addition, an electronic paper is a display technology to which properties of general ink are applied. The electronic paper may be different from the conventional flat panel display in using reflected light. The electronic paper may change information using a twisted ball or electrophoresis using a capsule. In a state in which the flexible display unit 151 is not deformed (e.g., a state of having an infinite curvature radius, hereinafter referred to as a basic state), a display area of the flexible display unit 151 becomes flat. In a state in which the flexible display unit 151 is deformed by an external force from the basic state (e.g., a state of having a finite radius of curvature, hereinafter referred to as a deformed state), the display area may become a curved face. As shown, information displayed in the deformation state may be visual information output on the curved face. Such visual information is implemented by independently controlling light emission of sub-pixels arranged in a matrix. The sub-pixel refers to a minimum unit for implementing one color. When external force is applied to the flexible display unit 151, the flexible display unit 151 may be deformed to switch from the default state, which is the flat state, to a bent state, which is not the flat state.

The flexible display unit 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and area on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 (see FIG. 1).

The deformation detection means may be disposed in the flexible display unit 151 or a case (first to second frames 101 to 102 to be described later) to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may include various kinds of information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The deformation of the flexible display unit 151 may vary depending on the positions of the first frame 101 and the second frame 102. As shown in FIG. 2, since the bending position on the flexible display unit 151 is determined according to the positions of the first frame and the second frame, the bending deformation position of the flexible display unit 151 and the area thereof positioned on the front may be calculated based on the positions of the first frame 101 and the first frame 102 in place of the deformation detection means of the flexible display unit 151.

The state conversion (first or second state) of the flexible display unit 151, i.e., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200, which will be described later.

The flexible display unit 151 of the present disclosure is bent 180 degrees by rolling around a side portion of the mobile terminal 100 facing in the first direction. Accordingly, based on the side portion of the mobile terminal 100, a part of the flexible display unit 151 is disposed on the front of the mobile terminal 100, and the other part of the flexible display unit 151 is disposed on the rear of the mobile terminal 100. For simplicity, the part of the flexible display unit 151 positioned on the front is called a front face, and the other part of the flexible display unit 151 positioned on the rear is called a rear face. As illustrated in FIG. 2, the mobile terminal may extend in the first direction or contract in the second direction opposite to the first direction. In this case, the area of the flexible display unit 151 positioned on the front changes. That is, the sizes of the front face and the rear face may be changed according to a change in the state of the mobile terminal.

In addition, the flexible display unit 151 may be rolled on or released at the side portion in the first direction of mobile terminal. Accordingly, the rear face of the display unit 151 moves, so that the size of the front face of the display unit 151 may be adjusted. Since the size of the flexible display unit 151 is determined and the flexible display unit 151 is formed of one continuous body, an area of rear face of the display unit 151 decreases as an area of the front face of the display unit 151 increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the area of the display unit 151 on the front face of the mobile terminal 100.

Since the variable part 151*b* is flexible, it needs a support structure on its backside to maintain a flat state. To support the backside of the variable part 151*b*, further includes is a rolling hinge capable of maintaining a flat state of the variable part 151*b* as well as enabling flex deformation of the variable part 151*b*.

The rolling hinge 104 is located on the backside of the variable part 151*b* of the display unit 151 and may support it to be flexed in the first direction or maintain a flat plane without being flexed in a third direction vertical to the first direction. The rolling hinge 104 includes a plurality of support bars extended in the third direction. A plurality of the support bars are disposed side by side in the first direction. Through an angle change between the support bars, the rolling hinge 104 may be flexed together with the variable part 151*b*. Both end portions of the support bar may include slide hooks moving along slide rails formed on the second frame 102 to guide the movement of the display unit 151.

A rolling sheet located between the support bar and the display unit 151 may include a cuff pattern configured with a plurality of slits extended in the third direction to facilitate deformation in the first direction. In the cuff pattern, the slots extended in the third direction are disposed cornerwise. The cuff pattern restricts the deformation in the third direction but allows flex deformation in the first direction only.

The second frame 102 may include a roll bracket 1028 (see FIG. 6) including a curved surface inside. A location of the roll bracket 1028 is non-limited. Yet, the roll bracket 1028 may be disposed at a first direction end portion of the second frame 102 to provide a maximum-size screen to a front side. Such a roll bracket 1028 may have a bar shape extended in the third direction vertical to the first direction and including a curved surface so as to have the display unit 151 wound thereon and may In addition to prevent the breakage of the display unit 151 wound around the roll bracket 1028, an edge frame 1024 disposed at the first direction end portion of the second frame 102 may be included.

Figure 4:
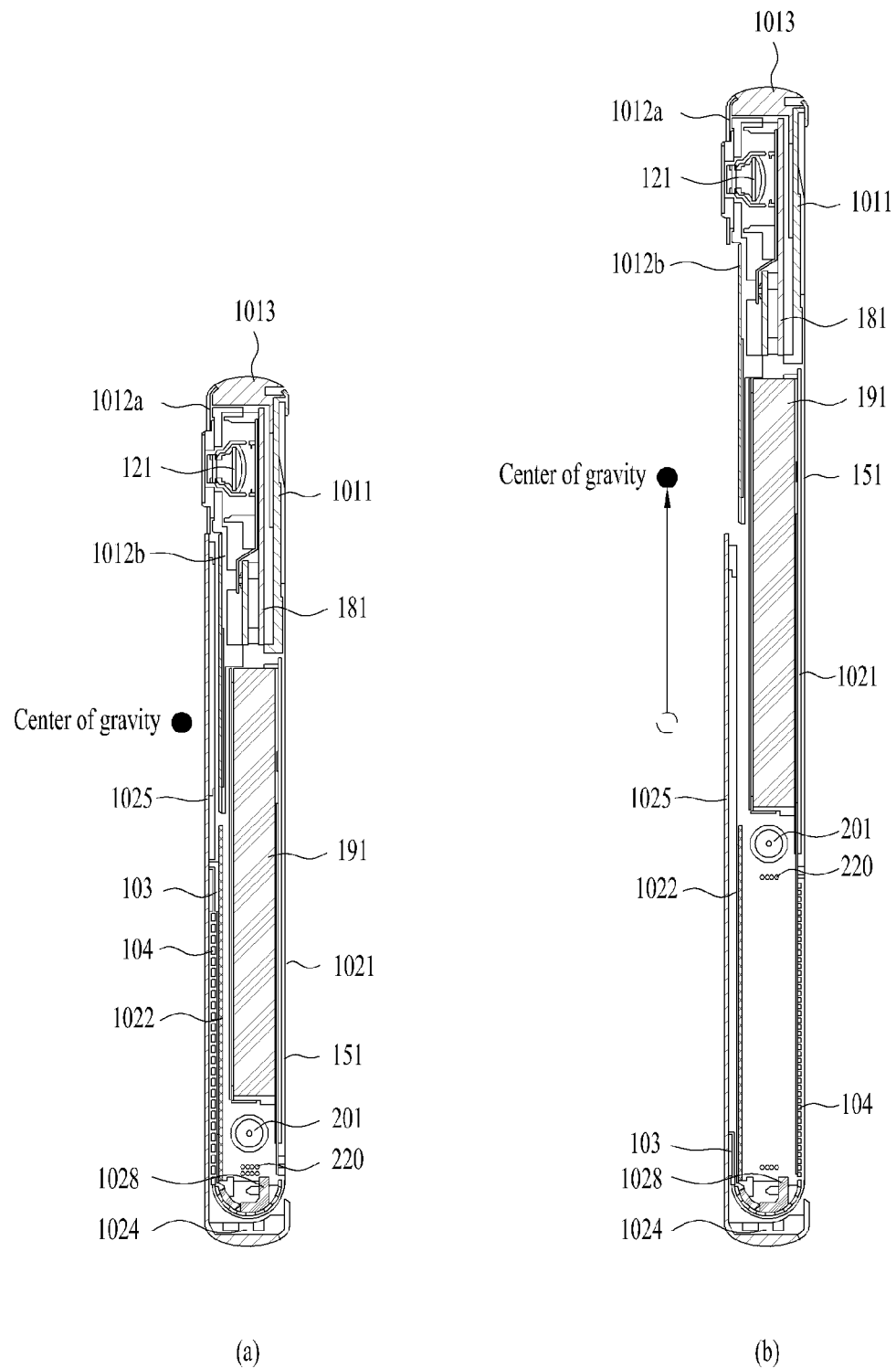
FIG. 4 is a side cross-sectional diagram of a mobile terminal according to one embodiment.
Figure 5:
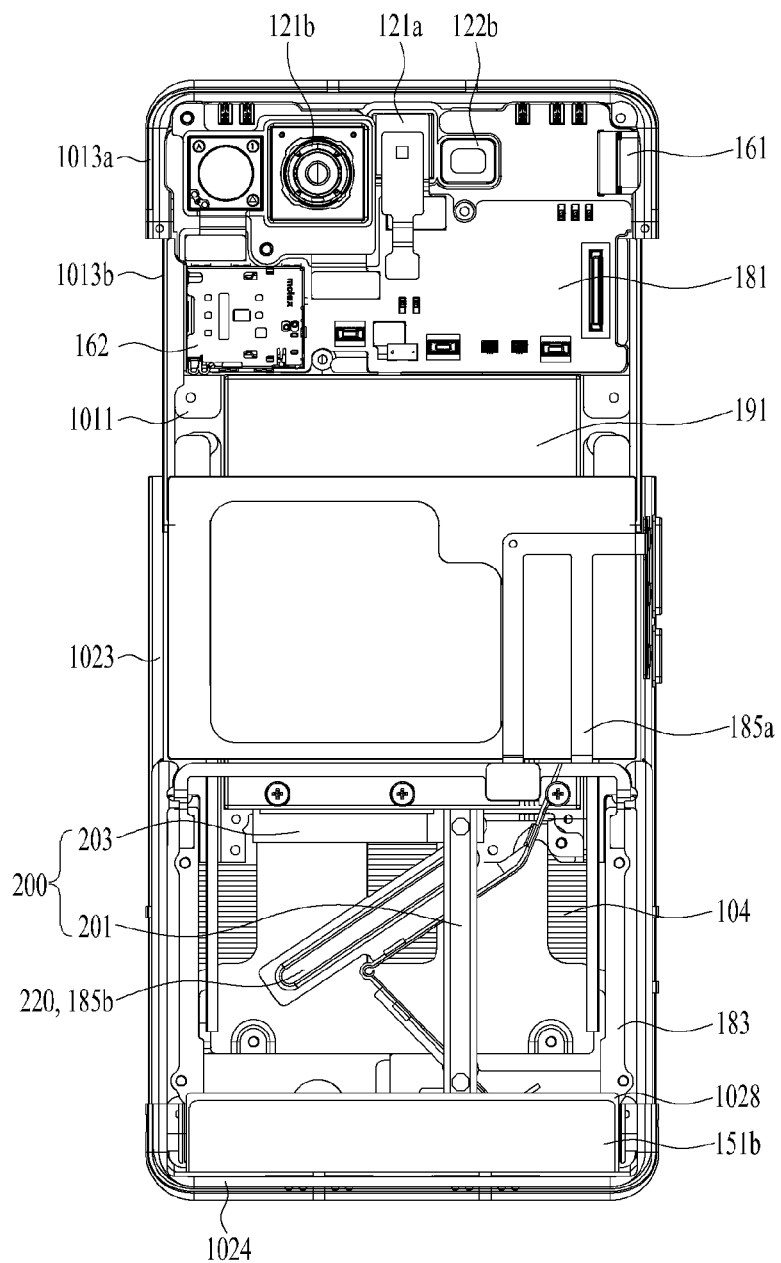
FIG. 5 is a backside diagram showing inner components in a second state of the embodiment shown in FIG. 4.

FIG. 4 is a lateral cross-sectional diagram according to one embodiment of the present disclosure and shows the cross-sections A-A and B-B of FIG. 3. FIG. 5 is a backside diagram showing inner components in the second state of the embodiment shown in FIG. 4. The present embodiment shows an example that the battery 191 is installed in the first frame 101. The battery 191 is located between a first front part 1011 and a first rear part 1012 of the first frame, and an open space in a bottom part of the first rear part 1012 may be covered via a rear cover 1025.

In case that the battery 191 is located in the first frame 101 Like the present embodiment, since most of the components are located in the first frame 101, the types of electronic components installed in the second frame 102 may limitedly include the lateral antenna, the user input unit 123, the coil antenna 114 on the backside and the like. Since the battery 191 and the main board 181 are located in the first frame 101 together, a signal connecting part 185*b* connecting the respective components can be configured more neatly.

According to the present embodiment, when the mobile terminal 100 switches to the second state, an empty space is formed under the battery 191. The second frame 102 enclosing the front and rear of the battery 191 moves in the first direction and supports the backside of the variable part 151*b* having moved forward. As an empty space is formed in the second frame 102 located on the backside of the variable part 151*b* in the second state, if a significant force is applied to a front side, flex deformation may occur. To increase bearing power of the second frame 102, a support link 220 unfolded in an extended portion may be further included. The support link 220 is folded in the first state to minimize an installation space or unfolded in the second state to reinforce the rigidity of the extended portion.

Since the battery 191 is located in the first frame 101, the drive unit 200 is located in the first direction rather than the battery 191 and may guide the slide movement between the first frame 101 and the second frame 102.

In the present embodiment, a drive motor 201 is located in the frame 101, a rack gear 203 is located in the second frame 102, and the rack gear 203 and the second frame 102 move in the first direction against the first frame 101. Since the drive motor 201 is disposed in a manner of being inclined to the first direction, the drive motor 201 and the rack gear 203 may be located in the first frame 101 and the second frame 102 in consideration of a moving space of the rack gear 203, respectively.

In case that the battery 191 is disposed in the first frame 101 like the present embodiment, most of the components are disposed in the first frame 101. Hence, there is an effect that center of gravity is inclined to one side when the mobile terminal 100 is extended. Particularly, in case that the first and second frames 101 and 102 are disposed in the top-bottom direction like the present disclosure, when the first frame 101 moves upward, as shown in FIG. 4(*b*), the center of gravity moves upward. While a user holds the bottom (i.e., second frame) of the mobile terminal, if the center of gravity moves upward, the mobile terminal may be easily dropped from the user's hand.

To solve the above problem, components in a frame need to be disposed in a manner of being distributed in a second state to minimize the shift of center of gravity even in the second state.

Figure 6:
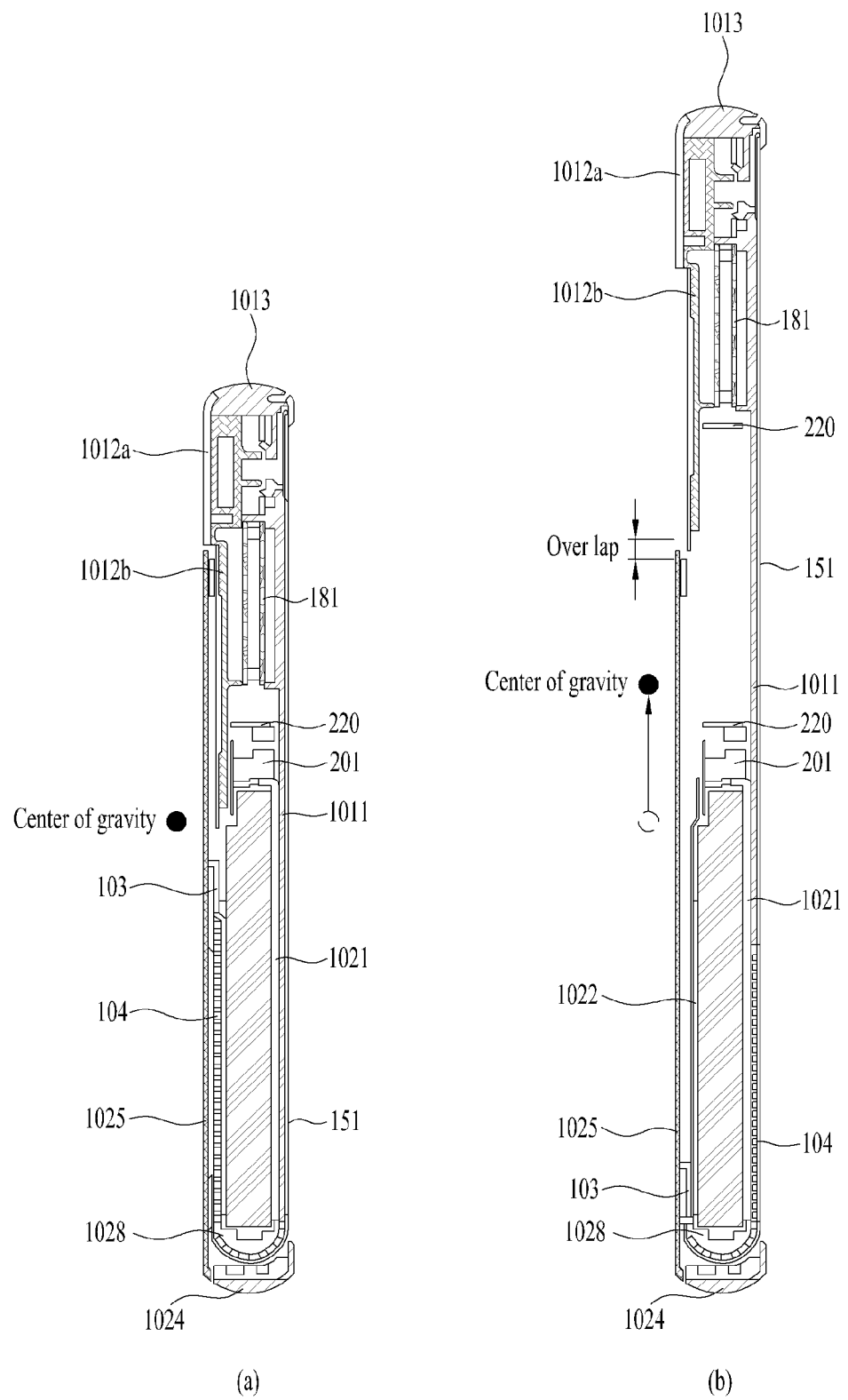
FIG. 6 is a side cross-sectional diagram of a mobile terminal according to another embodiment.
Figure 7:
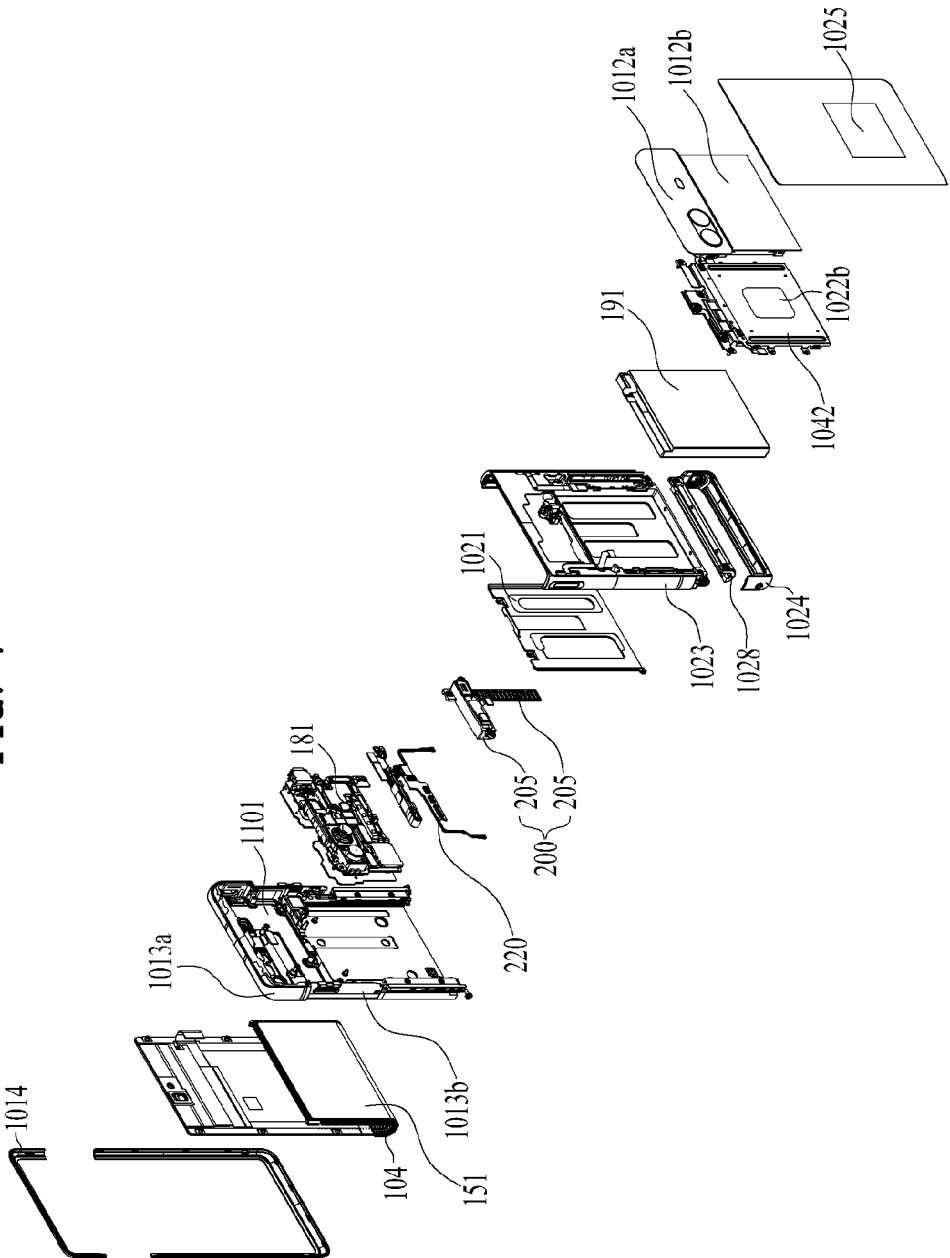
FIG. 7 is an exploded perspective diagram of a mobile terminal according to one embodiment.

As shown in FIG. 6, the battery 191 is disposed in the second frame of the mobile terminal 100, thereby minimizing the shift of center of gravity on switching to the second state. FIG. 6 shows another embodiment of the cross-sectional diagram of A-A and B-B shown in FIG. 3, and FIG. 7 is an exploded perspective diagram of the embodiment shown in FIG. 6.

The respective components of the mobile terminal 100 according to the present embodiment will be described in detail with reference to FIG. 6 and FIG. 7 as follows.

First of all, the first frame 101 includes a first front part 1011 located on a front side of the mobile terminal 100 to be coupled with the fixed part 151*a* of the display unit 151 and a first rear part 1012 located on a rear side of the mobile terminal 100. The first rear part 1012 may include a first backside 1012*a* always exposed externally and a second backside 1012*b* exposed externally in an extended state only. As shown in FIG. 3, the second backside 1012*b* is not externally exposed in the first state by being covered with a rear cover 1025 of the second frame 102 but is externally exposed in the second state.

The second frame 102 includes a second front part 1021 located on the front side and a second rear part 1022 located on the rear side of the mobile terminal 100. The second front part 1021 is located on the backside of the first front part 1011 in the first state or withdrawn in the second state from the first front part 100 in the first direction.

The display unit 151 may not be fixed to the second frame 102 but a position on the second frame 102 may be variable in response to a slide movement of the second frame 102. The variable part 151*b* of the display unit 151 is located on the backside and lateral side of the second frame 102 in the first state of the mobile terminal 100. The variable part 151*b* located on the backside moves to the front side of the second frame 102 in the second state.

The second front part 1022 supports the variable part 151*b* having moved to the front side in the second state, and the second rear part 1022 supports the variable part 151*b* having moved to the rear side in the first state.

The slide frame 103 connected to the end portion of the display unit 151 to enable the display unit 151 to slide to move moves on the backside of the rear part 1022. The display unit 151 coupled to the slide frame 103 is a moving part sliding to move in response to a movement of the slide frame 103 and is disposed to face the backside direction of the mobile terminal 100 at all times. Since the moving part does not move to the front side, it may restrict a front side area of the display unit 151 and fix the variable part 151*b* having moved to the front side to maintain a flat state by pulling on the variable part 151*b*.

The second frame 102 may further include a rear cover 1025 covering the variable part 151*b* located on the backside of the second rear part 1022. If the end portion of the display unit 151, i.e., the moving part is exposed externally, the display unit 151 may be broken possibly. The rear cove r 1025 may prevent the rear side of the display unit 151 from being externally exposed in direct. The second rear part 1022 may include a guide member (not shown) guiding a slide movement of the slide frame 103 moving on the backside of the second rear part 1022, and the rear cover 1025 may cover the guide member not to be exposed externally.

The rear cover 102 may be formed of opaque substance or contain transparent substance. The transparent rear cover 1025 may provide a user with information using the display unit 151 located on the backside in the first state.

For example, when a user takes a shot in a user-standing direction using a camera located in rear, the user may watch a preview image of the camera via the display unit 151. In case that the mobile terminal 100 is placed in a manner that a backside direction faces upward, an alarm and the like may be provided via the display unit 151 located on the backside.

Yet, since the second rear part 1022 may be visually exposed through the rear cover 1025 in the second state, it may perform coating (or tinting) for lowering transmittance to make an interior only viewable if the display unit 151 is turned on, i.e., light is projected from an inside.

The rear cover 1025 may cover the second backside 1012*b* of the first frame 101 by being extended in the second direction from a portion that covers the rear part of the display unit 151. As shown in FIG. 3(*a*), the rear cover 1025 may form a backside exterior of the mobile terminal 100 in the first state while covering the second backside 1012*b* in the first state together with the first backside 1012*a*.

As shown in FIG. 3(*b*), if switching to the second state, the second backside 1012*b* is exposed through the backside. To prevent the components inside the mobile terminal 100 from being exposed, as shown in FIG. 6(*b*), the second backside 1012*b* and the rear cover 1025 overlap each other at least in part even in the second state.

Referring to FIG. 6(a), the second backside 1012b and the rear part 151b of the display unit 151 of the present disclosure may be disposed to neighbor each other in the first direction without overlapping with each other. In case that the second backside 1012b and the display unit 151 are disposed to overlap each other, the second backside 1012b should be recessed into the mobile terminal 100 by the thickness of the display unit 151, the rolling hinge 104 and the second rear part 1022.

In this case, as an installation space within the first frame 101 is reduced and a step difference between the first backside 1012a and the second backside 1012b is significant, a user may feel sense of difference when holding the extended mobile terminal 100.

Therefore, according to the present disclosure, the display unit 151 and the second rear part 1022 are disposed in top and bottom directions, respectively, and a portion externally exposed by being extended in the second state and a portion at which the display unit 151 is located in the first state may be separated in the first direction.

An extended part of the rear cover 1025 covering the second backside 1012a in the first state covers the inner components exposed in response to the movement of the second rear part 1022 in the second state. The second backside 1012a may cover the backside of the first frame 101 exposed in response to the movement of the rear cover 1025, and a first direction length of the second backside 1012b may have a length equal to or greater than a moving distance of the second frame 102.

The mobile terminal 100 of the present disclosure includes frames 101 and 102 in which components are mounted, and the frames 101 and 102 of the present disclosure may vary in size in the first direction as shown in FIG. 2. One or more frames 101 and 102 move relative to each other, and sizes thereof may vary in the first direction. Electronic components are mounted in the frames 101 and 102, and the flexible display unit 151 is located out of the frames 101 and 102.

Since the mobile terminal 100 of the present disclosure includes the flexible display unit 151, the flexible display unit 151 may be combined in a form surrounding front faces and rear faces of the frames 101 and 102. The frame may include the first frame 101 and the second frame 102 moving in the first direction with respect to the first frame 101. The first frame 101 and the second frame 102 include front portions, a rear portions, and side portions, respectively, and are coupled to each other.

First, the first frame 101 may correspond to a main body of the mobile terminal 100 and may define a space for accommodating therein various parts between the first front portion 1011 and the first rear portion 1012. In addition, the first frame 101 may accommodate the second frame 102 movably coupled to the first frame 101 in such a space. More specifically, the first frame 101 may include the first front portion 1011 disposed at a front portion of the mobile terminal 100 to support a front surface of the display unit 151, and the first rear portion 1012 disposed on a rear surface of the mobile terminal and equipped with various parts.

Such first front portion 1011 and first rear portion 1012 may be spaced apart from each other at a predetermined spacing to define the predetermined space therebetween and may be connected to each other by a first side portion 1013. The first side portion 1013 may be formed integrally with the first rear portion 1012 or the first front portion 1011. The camera 121, the audio output module 152, an input/output terminal and the controller 180 may be accommodated in the space within the first frame 101 as the parts of the mobile terminal 100. For example, the controller 180 may become the main board 181 including a processor and electronic circuit controlling operations of the mobile terminal 100.

The battery 191, which plays a role as the power supply unit 190, occupies the largest area of the mobile terminal 100. As the mobile terminal 100 includes more components, and more particularly, a time of using the display unit 151 increases, capacity of the battery 191 becomes more significant. Hence, a size of the battery 191 tends to increase despite downsizing other components. Although a space occupied by the battery 191 is large, since the battery 191 is heavy, the center of gravity of the mobile terminal 100 may change depending on a location of the battery 191.

As shown in FIG. 6, according to the present embodiment, the battery 191 is disposed in the second frame 102, thereby minimizing the shift of center of gravity when the mobile terminal 100 is extended. In case that the battery 191 is also installed in the first frame 101, the center of gravity seems almost similar to a slide moving distance of the frame 101 and 102. Yet, in case of the present embodiment, as weight is distributed to the first frame 101 and the second frame 102, the center of gravity may be located at a middle portion of an extended state. If the battery 191 is located in the first frame 101 like the embodiment shown in FIG. 4, since an inside of the second frame 101 includes an empty space in the extended state of the mobile terminal 100, it causes a problem that a backside bearing power of the variable part 151b is weak. Although the support bars of the rolling hinge 104 located on the backside of the variable part 151b and the second front part 1021 may support the variable part 151b, as the bearing power is limited, if a considerable force is applied to the front side, flex deformation may occur.

In addition, the battery 191 is disposed between the second front part 1021 and the second rear part 22 of the second frame 102, thereby supporting the backside of the variable part 151b having moved to the front side of the mobile terminal 100. If the battery 191 is located on the backside of the second front part 1021, the variable part 151b having moved to the front side may maintain a flat state.

Referring to FIG. 3, a lateral part of the first frame 101 may include a first lateral side 1013a exposed at all times and a second lateral side 1013b exposed selectively. A second lateral part 1023 forming a lateral side of the second frame 102 covers the second lateral side 1013b in the first state or exposes the second lateral side 1013b in the second state.

The second lateral side 1013b is located at a portion exposed externally in the second state only and may minimize a section overlapping with the second lateral part 1023 of the second frame 102.

In an inner space of the second lateral part 1023 failing to overlap with the second lateral side 1013b, guide rails 231 and 232 guiding slide movements of the frames 101 and 102, an auxiliary board 183 connected components of the second frame 102 and the like may be disposed. The first lateral side 1013a and the second lateral side 1013b are located between the first front part 1011 and the first and second backsides 1012a and 1012b, thereby forming an inner space of the first frame 101. Since the first lateral side 1013a is exposed externally at all times, it may implement an antenna and the like. An SIM card tray slot 162 and the like, which need not be exposed at all times, may be disposed on the second lateral side 1013b.

The second lateral part 1023 may form a component installation space inside together with the second front part 1021 and the second rear part 1022 and also form an exterior of the mobile terminal 100 together with the rear cover 1025. As shown in FIG. 3, the second lateral part 1023 may have the same height of the rear cover 1025. A front bezel 1014 enclosing a front circumference of the display unit 151 may be further included. The front bezel 1014 fixes the end portion of the display unit 151 to the first frame 101 and the second frame 102.

The front bezel 1014 may include a first bezel neighboring the first lateral side 1013a of the first frame and a second bezel neighboring the second lateral part 1023 of the second frame. In the first state, as shown in FIG. 2(a), the first and second bezels may be connected to each other. In the second state, as shown in FIG. 2(b), the first bezel and the second bezel may be spaced apart from each other.

Figure 8:
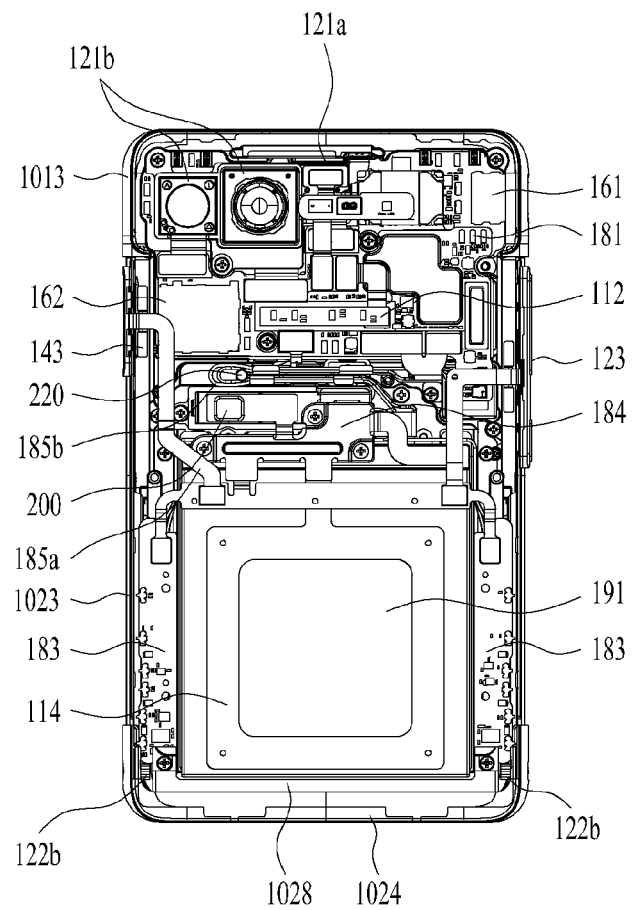
FIG. 8 and FIG. 9 are diagrams showing inner components in a first state and a second state, respectively.
Figure 9:
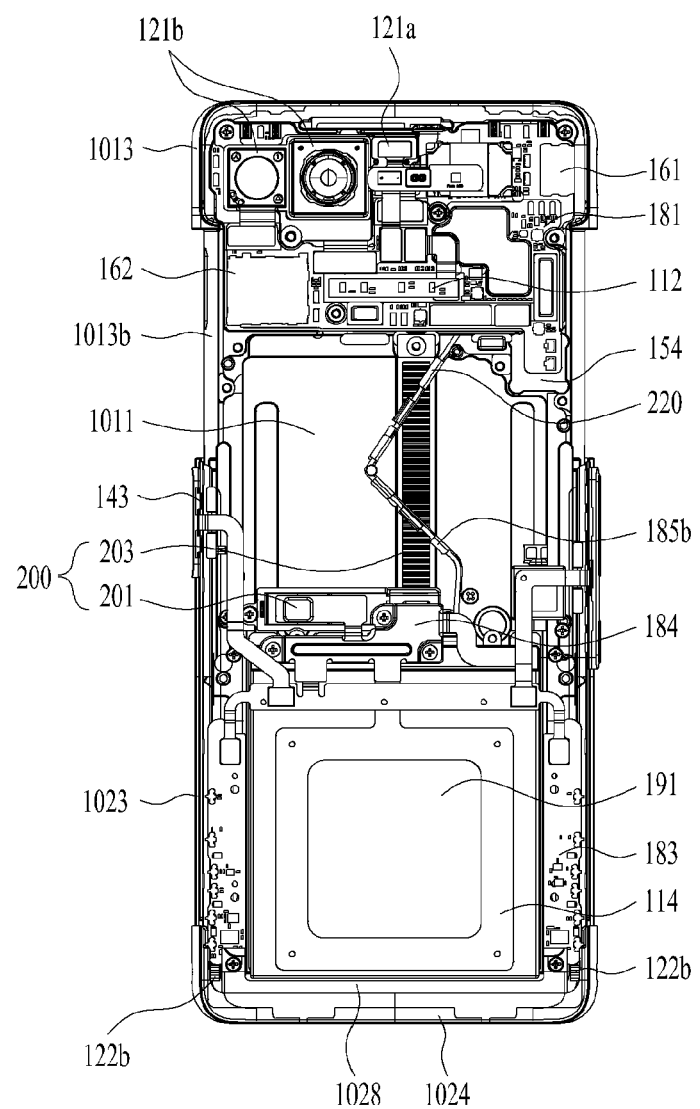

FIG. 8 and FIG. 9 are diagrams showing inner components in the first state and the second state of the mobile terminal 100, respectively. in a manner of removing the display unit 151, the rear part 1012 and 1022 and the rear cover 1025, which cover the backsides of the display unit 151 and the mobile terminal 100, FIG. 8 and FIG. 9 show the first state and the second state, respectively. The main board 181, the battery 191, the cameras 121a and 121b, the vibration module 154, the microphone 122a, the audio output module 152, the rack gear 203 of the drive unit 200 and the like are installed in the first frame 101. The battery 191, the user input unit, the coil antenna 114, the mobile communication antenna 112, the microphone 122b, the motor 201 and pinion gear (not shown) of the drive unit 200 and the like may be installed in the second frame 102.

The main board 181 may be located in the first frame 101, and cameras 121a and 121b, a vibration module 154, interface units 161 and 162, an antenna 112b and the like may be disposed in the first fame 101 in a manner of being mounted on the main board 181. The cameras may further include the front camera 121a facing the front side of the mobile terminal 100 as well as the main camera 121b facing the backside of the mobile terminal 100. For the disposition of the front camera 121a, a partially deactivated area may be included in the top end of the display unit 151.

A cable terminal 161 for charging or data transmission may be located on the first lateral side 1013a to be available even in the first state of the mobile terminal 100. A card mounting unit 162 for mounting a USIM or memory card thereon is not a normally removable part and may be disposed adjacent to the second lateral side 1013b that is open only in the second state.

It may be able to implement a mobile communication antenna using the first lateral side 1013a, and an array antenna 112b for a signal of mmWave may be disposed on the backside of the main board 181 to face the backside of the mobile terminal 100.

The drive unit 200 providing power for the slide movement between the first frame 101 and the second frame 102 includes a drive motor 201, a pinion gear (not shown) rotated by receiving a rotational force of the drive motor, and a rack gear 203 engaging with the pinion gear to make a rectilinear motion. The drive motor 201 and the rack gear 203 are coupled to different frames, respectively. According to the present embodiment, the drive motor 201 may be located in the second frame 102 and the rack gear 203 may be located at the pinion gear, and vice versa.

Yet, since a portion held by a user is a portion of the second frame 102, the drive motor 201 is located in the second frame 102 rather than the first frame 101 for the more stable driving of the drive motor 201.

The drive unit 200 may be located above the battery 191 for the stable slide movement while minimizing the short length of the rack gear 203. The drive unit 200 located above the battery 191 guides the slide movement in the middle portion of the mobile terminal 100 in the first direction, whereby the drive force may be stably transferred without being inclined to one side.

By disposing a location of the rack gear 203 to be adjacent to the middle portion of the mobile terminal 100 in the third direction, as shown in FIG. 9, the slide movement can be performed stably without inclination when the frames 101 and 102 slide to move.

The rack gear 203 of the drive unit 200 is disposed on the backside of the first front part 1011 to face the backside of the mobile terminal 100. In order that the rack gear 203 can be located in the second frame 102 in the first state, a slot extended in the first direction may be formed at a position corresponding to the rack gear 203 in the first front part 1011. In the first state, the rack gear 203 is disposed to overlap with the battery 191 installed in the second fame 102. In the second state, the rack gear 203 moves in the second direction along the first frame 101 and may be then extended to be located in an empty space.

According to the present embodiment, as the components are distributed in the first frame 101 and the second frame 102, the center of gravity is stable and the battery 191 advantageously supports the variable part 151b of the display unit 151. Yet, a signal connecting part 185b connecting the components installed in the first frame 101 to the components installed in the second fame 102 are required. The signal connecting part 185b may include electrical signals and power of the battery 191 and use substance deformable in response to movement of a frame.

The signal connecting part 185b may be configured using a Flexible Printed Circuit Board (FPCB) or a coaxial cable. If an antenna signal is externally affected, noise is generated. Hence, the signal connecting part 185b may use a coated coaxial cable.

The signal connecting part 185b may be bent between the first frame 101 and the second frame 102. As the signal connecting part 185b is bent, if the FPCB or coaxial cable is folded in a thickness direction of the mobile terminal 100 in the first state, radius of curvature of the bent portion is small. If a position of the bent portion varies depending on a movement of the frame, it may cause a problem of durability.

Therefore, the signal connecting part 185b of the present disclosure is disposed in the first direction of the mobile terminal 100 in the first state in a manner of overlapping. And, the bent portion of the signal connecting part 185b is widened in the second state, whereby the angle may change.

Figure 10:
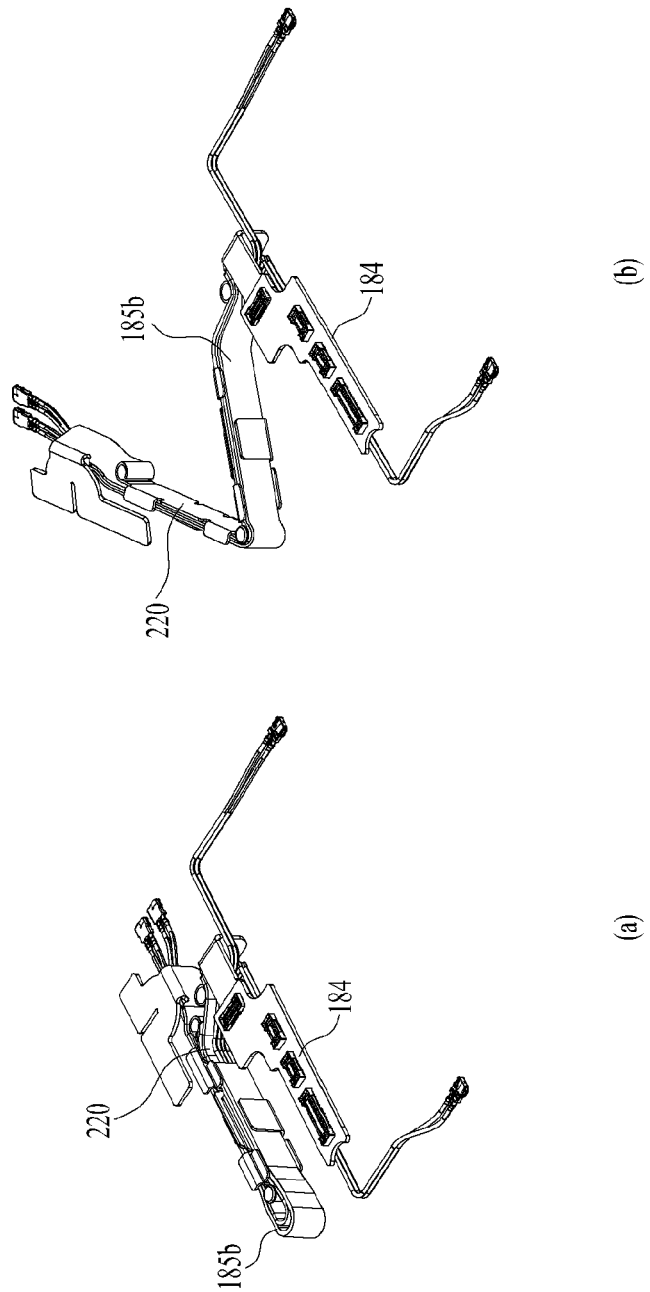
FIG. 10 is a diagram showing a signal connecting part and a support link installed inside a mobile terminal according to the present disclosure.

FIG. 10 is a diagram showing the signal connecting part 185b and the support link 220 installed in the mobile terminal 100 according to the present disclosure. Since an inside of an extended part according to the extension of the mobile terminal 100 is empty, if a pressure is applied by a strong force, flex deformation may occur. To support the empty space, a foldable support link 220 may be placed between the first frame 101 and the second frame 102.

The support link 220 includes a first link having one end coupled to the first frame 101 and a second link having one end coupled to the second frame 102. The other end of the first link and the other end of the second link are hinged together so that angles of the first and second links may vary in response to a slide movement of the frame. While the mobile terminal 100 is folded, as shown in FIG. 8, the first link and the second link may be disposed to touch each other in a manner that an angle between the two links becomes 0°.

While the mobile terminal 100 is extended, as shown in FIG. 9, the angle between the first and second links may be unfolded to have about 70°. If the two links are unfolded at 180°, it is difficult to fold then again. If the support link 220 is extended in the first direction, there may be a section that is not supported in the third direction. Therefore, to increase the bearing power in both of the first direction and the third direction that can be supported by the support link 220, an angle of the support link 220 may be configured to form about 900 in the second state.

As shown in FIG. 10, the link may be located between the first front part 1011 and the second backside 1012b in the thickness direction of the mobile terminal 100, and a thickness-directional width may have a width corresponding to a space between the first front part 1011 and the second backside 1012b.

The support link 220 guides the folding of the signal connecting part 185b as well as supports the empty space within the frame due to the extension of the mobile terminal 100. Since the signal connecting part 185b is formed of flexible substance, when the frame 101 and 102 slides to move, the signal connecting part 185b may be caught on the drive unit 200 or the frame 101 and 102 to as to be broken probably. The signal connecting part 185b may be coupled to the support link 220 so that its shape can change together with the support link 220, whereby the signal connecting part 185b may be prevented from being broken while sliding to move.

One side of the signal connecting part 185b may be connected to the main board 181 installed in the first frame 101, and the other side may include a middle board 184 collecting signals of components located in the second frame 102. The battery 191, the coil antenna 114, the microphone 122b and the antenna using the lateral part of the second frame 102 may be connected to the main board 181 through the middle board 184.

The coil antenna is located in a most backside direction of the mobile terminal 100, thereby enabling short-range wireless communication without signal interference from other components. Thus, as shown in FIG. 8, the coil antenna may be located on the backside of the battery 191.

A plurality of microphones 122a and 122b may be included for noise cancellation. The main microphone 122b is generally located at the center of a bottom part of the mobile terminal 100. Yet, in the present disclosure, as the bottom part of the mobile terminal 100 is a space for winding the display unit 151 therein, it is difficult to secure a microphone installation space and connect to the controller. Therefore, according to the present embodiment, the microphone 122b may be disposed on both sides adjacent to the second direction of the second frame 102 in a manner of avoiding the display unit 151.

The portion around which the display unit 151 is wound may include a rolling bracket 1028 having a curved surface corresponding to the curvature of the display unit 151. The rolling bracket 1028 is coupled to a first direction end portion of the second frame 102 and may include a roller (not shown) rotated to support the rotation of the display unit 151.

Figure 11:
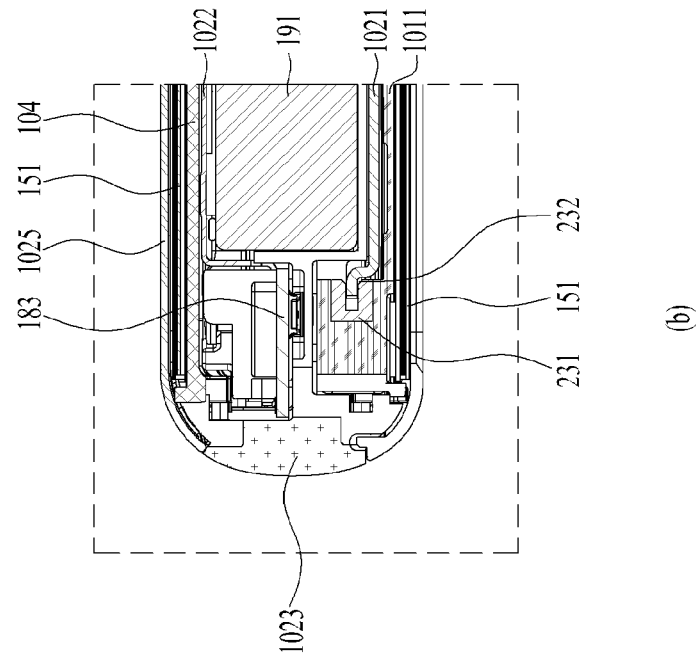
FIG. 11 is a diagram showing slide movements of first and second front parts and a linear guide of the present disclosure.
Figure 11:
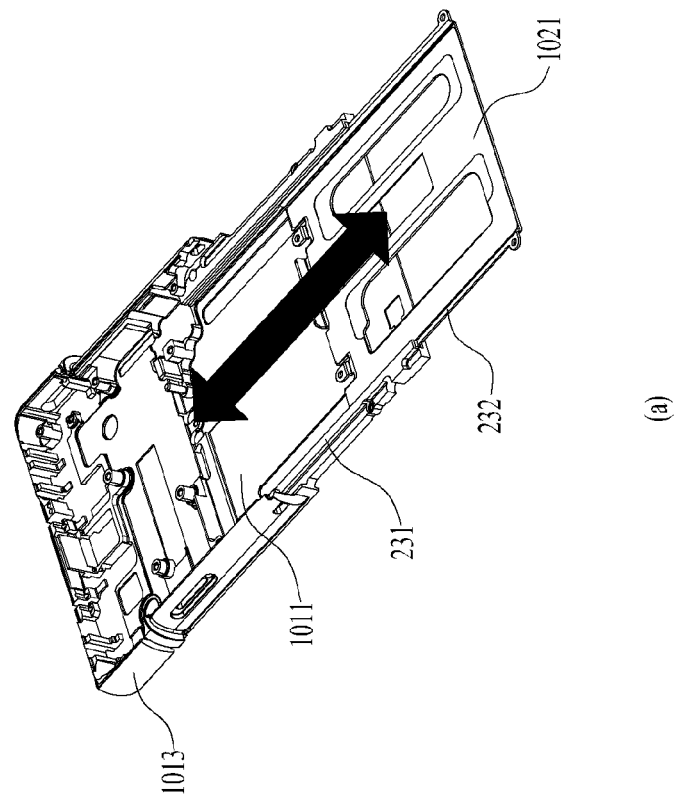

FIG. 11(a) is a diagram showing the slide movements of the first and second front parts 1011 and 1021 and the linear guide 231 and 232, and FIG. 11(b) is a cross-sectional diagram showing the location of the linear guide according to the line C-C shown in FIG. 2.

The second front part 1021 located on the backside of the first front part 1011 in the first state moves in the first direction and supports the backside of the variable part 151b having moved from the backside to the front side by being exposed from the first front part 1011. The rolling hinge 104 located on the backside of the variable part 151b may have the height corresponding to a step difference between the first front part 1011 and the second front part 1021. A linear guide 231 and 232 may be further included to support the movements in the first and second directions by cutting off motions between the first and second frames 101 and 102 other than the first and second directions.

If a separate guide member is attached to the first and second frames 101 and 102 as a linear guide, it may be externally exposed when the mobile terminal 100 is extended, thereby causing a problem of increasing a volume occupied within the mobile terminal 100.

To minimize the volume occupied within the mobile terminal 100 and cut off the motion of the frame in the third direction, as shown in FIG. 11(b), a linear guide 231 and 232 configured with a pair of guide rails confronting each other in the third direction may be included.

As shown in FIG. 11(a), the lateral part of the first frame 101 includes a first lateral side 1013a exposed externally at all times and a second lateral side 1013b exposed externally only in the second state, and a portion blocked by the second lateral part 1023 of the second frame 102 omits a lateral part even in the second state. Instead, the linear guide 231 and 232 may be disposed by utilizing this space.

Referring to FIG. 11(b), the first guide rail 231 coupled to the first front part 1011 and the second guide rail 232 located at the end portion of the second front part 1021 may be disposed in a manner of confronting each other in the third direction. The first guide rail 231 may include a groove extended in the first direction by enclosing the second guide rail 232. The second guide rail 232 may use the end portion of the second front part 1021 as it is, and the first guide rail 231 may include a groove in a width corresponding to the thickness of the second front part 1021.

The first guide rail 231 contains POM substance. As direct inter-metal friction is avoided, abrasion of the linear guide 231 and 232 is minimized and a slide movement of the frame can be performed smoothly.

The linear guide 231 and 232 of the present embodiment is illustrated as containing POM in a manner that the first guide rail 231 encloses the second guide rail 232. On the contrary, the linear guide may include a first guide rail 231 in a plate shape and a second guide rail 232 containing the POM that encloses the first guide rail 231. In addition, as shown in FIG. 11(b), the second guide rail 232 may be located within the second rear part 1022 or the second lateral part 1023 as well as the second front part 1021.

Figure 12:
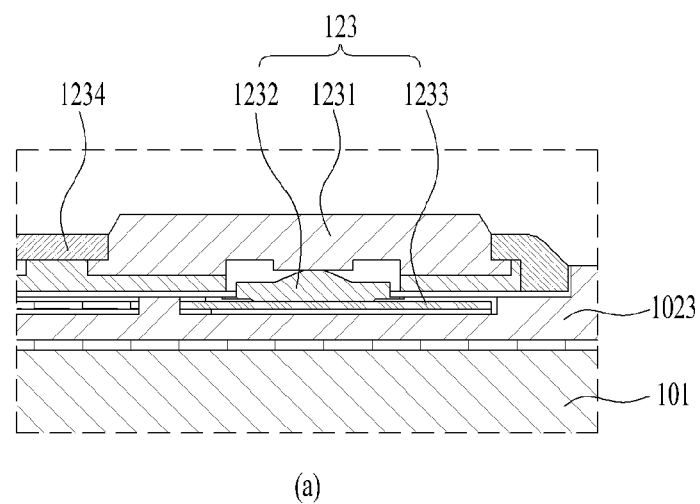
FIGS. 12 and 13 are diagrams showing a user input unit according to an embodiment of a mobile terminal.
Figure 12:
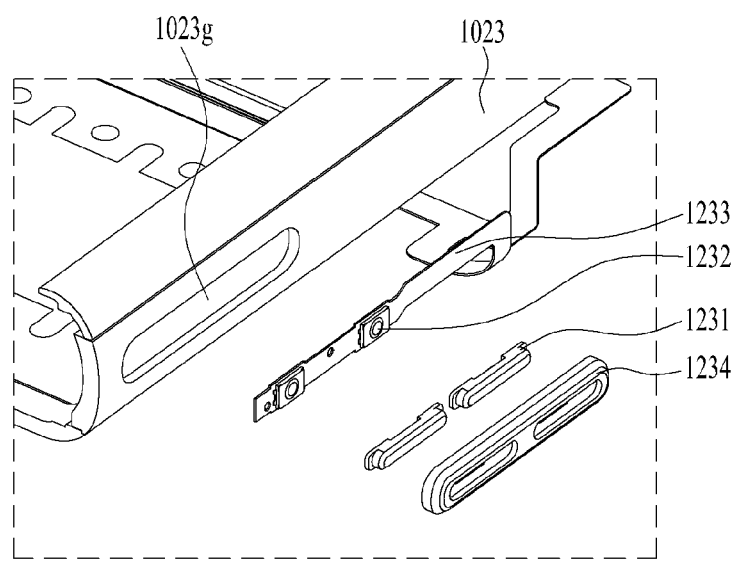
Figure 13:
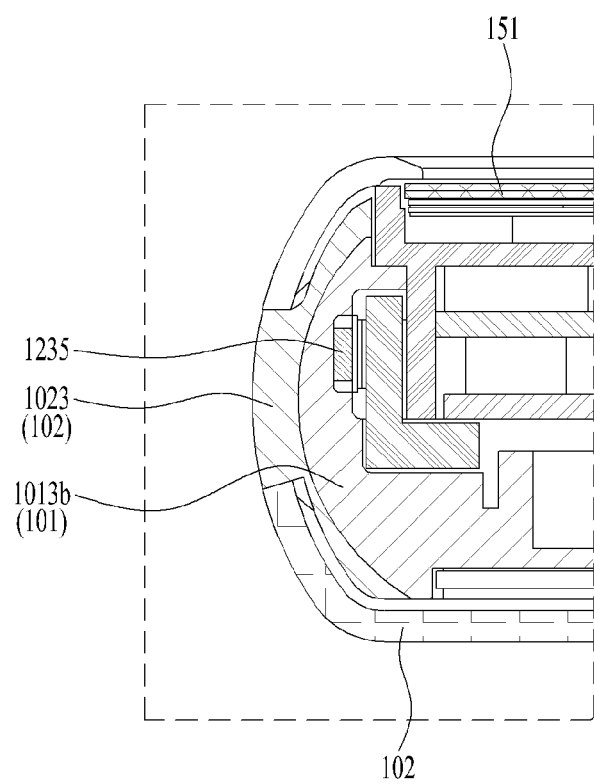

FIGS. 12 and 13 are diagrams showing the user input unit 123 according to an embodiment of a mobile terminal. As the size of the display unit 151 on the front surface of the mobile terminal 100 increases, the space for adding the user input unit 123 other than a touchpad to the front surface becomes insufficient. Instead, a button may be implemented in the lateral direction of the mobile terminal 100.

An input through the touchpad of the display unit 151 is difficult for a key, such as a volume key, used in a state of not looking at the display unit 151, or a key, such as a power button, for activating the mobile terminal in a state that the display unit 151 is turned off Thus, it is preferable for such key to receive an input through the physical user input unit 123.

It is inconvenient in terms of usability when the user input unit is located at a too high vertical level, so that it is preferable to dispose the user input unit at the location where the first side portion 1013 and the second side portion 1023 overlap each other. That is, the user input unit may be located in the second side portion 1023 or the user input unit may be located on the second side surface 1013*b* of the first side portion.

FIG. 12 shows an embodiment regarding the user input unit 123 located in the second side portion 1023, and FIG. 13 shows an embodiment regarding the user input unit 123 located on the second side surface 1013*b*.

The user input unit 123 in FIG. 12, which is the user input unit 123 implemented in the side portion of the second frame 102, may be seated by defining a groove 1023*g* in the side portion of the second frame 102. A switch board 1233 having a dome switch 1232 may be seated in the groove 1023*g* of the side portion, a top button 1231 may be overlapped with the dome switch 1232, and a button cover 1234 having a hole defined therein corresponding to the top button 1231 may be inserted into the side portion to fix the top button 1231.

When a thickness of the second side portion 1023 is increased, there is a problem in that a height difference between the first side surface 1013*a* and the second side surface 1013*b* increases. Thus, the button cover 1234 may be fixed at a location outward of the side portion to minimize the increase in the overall thickness of the second side portion 1023 of the second frame 102. When the second frame 102 moves in the first direction, a location of the user input unit 123 of such type also changes in the first direction.

The user input unit 123 in FIG. 13 is positioned on the second side surface 1013*b* of the first side portion 1013 of the first frame 101. Because the second side surface 1013*b* is covered by the second side portion 1023 of the second frame, it is difficult to apply the user input unit 123 using the dome switch as in the embodiment in FIG. 12.

Instead, a user input unit may be implemented using a force sensor 1235. The force sensor 1235 is also referred to as a force touch and operates by recognizing a pressing force. As a sensor that generates an electrical signal in response to a minute mechanical change, the force sensor 1235 may sense changes in a range from several um to tens of um on an attached surface.

The force sensor 1235 does not need to be directly exposed to the outside, so that, even when the force sensor 1235 is located inward of the first side portion 1013, the force sensor 1235 may sense a pressure applied to an outer surface of the second side portion 1023. Deformation with a magnitude equal to or greater than a predetermined magnitude may be sensed as a user input and distinguished from a touch input occurring at a time of simple gripping.

Because the second side portion moves during the extension in the second state to expose the second side surface 1023*b* of the first side portion, a distance from a top of the user input unit may be kept the same as in the first state.

Figure 14:
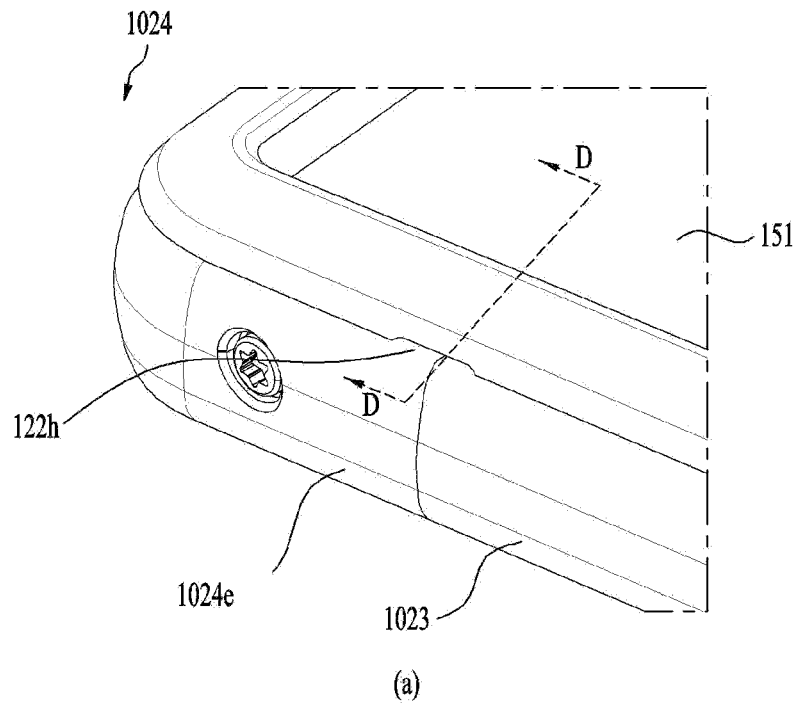
FIG. 14 is a view showing an embodiment of a microphone module.
Figure 14:
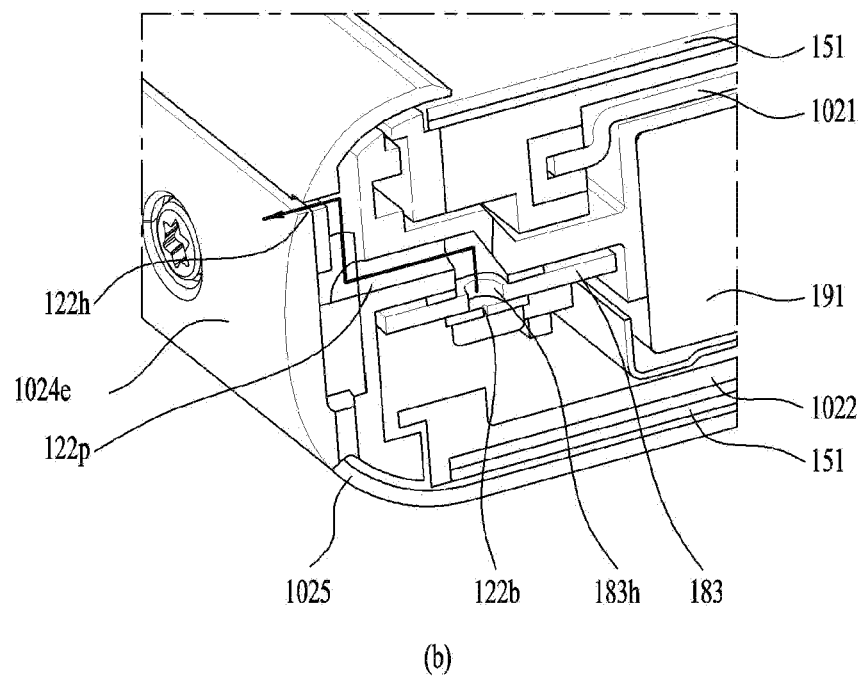

FIG. 14 is a view showing an embodiment of the microphone module 122*b*. The edge frame 1024 forms the side appearance of the mobile terminal 100 and protects the display unit 151 that bends and wraps around the first direction end portion of the second frame 102. The edge frame 1024 may be configured to form a continuous surface with the second side portion 1023 of the second frame 102. The edge frame 1024 may be coupled to the second frame 102 by extending to the side surface in the third direction where the second side portion 1023 is located. To this end, a fastener such as a screw 1024*s* may be used An extension portion 1024*e* of the edge frame 1024 may partially overlap with the second side portion 1023. The thickness of a portion where the second side portion 1023 and the extension portion 1024*e* of the edge frame 1024 overlap may be thin to form a continuous surface as shown in FIG. 14(*a*).

Generally, the microphone module 122*b* of the mobile terminal 100 is disposed at the center of the bottom of the mobile terminal 100, and the audio output module may be disposed on an upper portion of the mobile terminal 100. Thus, the mobile terminal 100 may be used similar to traditional telephones.

In the present disclosure, the first direction corresponds to the bottom of the mobile terminal 100, and the second direction corresponds to the top of the mobile terminal 100. The audio output module may be positioned in the second direction, while the microphone module 122*b* may be positioned in the first direction.

However, since the present disclosure includes the display unit 151 that wraps around the first direction end portion of the second frame 102, it is difficult to dispose the microphone module 122*b* at the center of the first direction end portion because the microphone module 122*b* is covered by the display unit 151.

Therefore, the microphone module 122*b* may be disposed in the third direction where the display unit 151 is not located. Specifically, a microphone hole 122*h* that faces in the third direction may be provided as shown in FIG. 14(*a*).

The microphone module 122*b* may be disposed only in the third direction. However, considering that the distance between the microphone module 122*b* and the mouth of the user varies depending on whether the user makes a call by placing the mobile terminal 100 on the left side of the face or the right side of the face. Accordingly, a pair of microphone modules 122*b* may be provided on the second frame 102 by also disposing the microphone module 122*b* in a fourth direction, which is opposite to the third direction.

Since the microphone modules 122*b* are symmetrical and structurally similar to each other when positioned on both sides of the mobile terminal 100, the present disclosure will be described based on the microphone module 122*b* positioned on one side.

The microphone hole 122*h* may be positioned between the second side portion 1023 and the extension portion 1024*e* of the edge frame 1024 in the front bezel to minimize exposure of the microphone hole 122*h* to the outside. The microphone hole 122*h* may be positioned in the second side portion 1023 or in the extension portion 1024*e* of the edge frame 1024. Alternatively, the microphone hole 122*h* may be disposed across the second side portion 1023 and the extension portion 1024*e* of the edge frame 1024 as shown in FIG. 14(*a*).

FIG. 14(*b*) is a cross-sectional view taken along line D-D of FIG. 14(*a*). FIG. 14(*b*) shows the microphone module 122*b* positioned on the auxiliary board and the microphone hole 122*h* aligned with the microphone module 122*b*.

Sound may be transmitted to the microphone module 122*b* through a sound passage 122*p* that starts from the microphone hole 122*h* and penetrates the second side portion 1023 of the second frame 102 and the edge frame 1024. When the microphone module 122*b* is mounted on the rear side of the auxiliary board 183, a hole 183*h* may be formed in the auxiliary board 183.

In this embodiment, since the mobile terminal 100 has the display unit 151 that bends at the bottom of the mobile terminal 100 such that the position of the display unit 151 is variable on the front and rear sides, a pair of microphone modules 122*b* need to be provided on the left and right. When the user holds the mobile terminal 100 with the user's hand, the microphone hole 122*h* may be blocked with the palm of the hand, which may affect the quality of calls.

Figure 15:
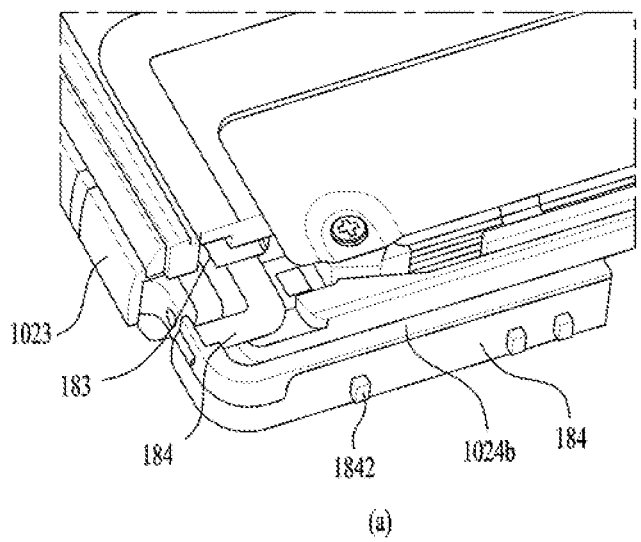
FIG. 15 is a view for explaining an exemplary method of accessing an antenna located on an edge frame.
Figure 15:
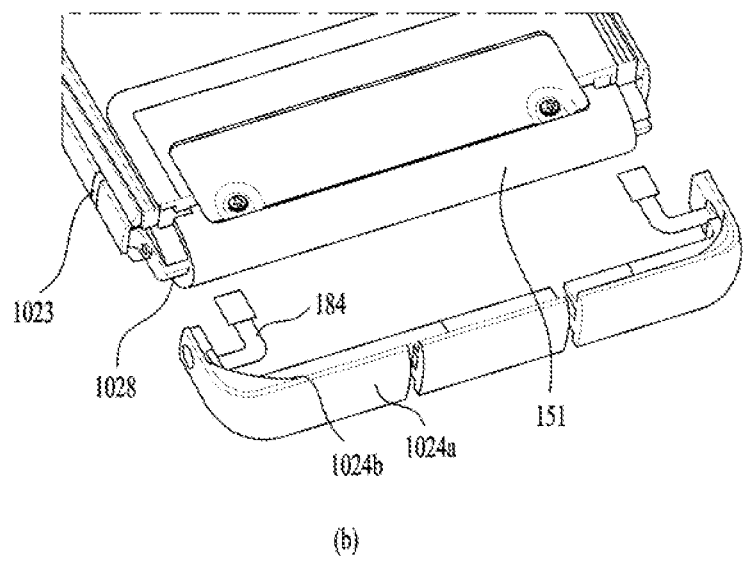

FIG. 15 is a view for explaining an exemplary method of accessing an antenna located on the edge frame 1024. If the edge frame 1024 includes a metallic material, the edge frame 1024 may be used as an antenna. The edge frame 1024 may include a plurality of conductive members 1024*a* each having a predetermined length, and the spaces between the conductive members 1024*a* may be filled with non-conductive members 1024*b*.

The non-conductive members 1024*b* may not only be positioned in the slit formed between the conductive members 1024*a* but also be located inside the conductive members 1024*a*, thereby forming the inner surface of the edge frame 1024 that faces the side surface of the display unit 151.

To configure the conductive members 1024*a* as an antenna, the conductive members 1024*a* need to be connected to the controller. Since there is a distance between the conductive members 1024*a* and the main board 181 mounted on the first frame 101, the conductive members 1024*a* may exchange signals with the main board 181 positioned on the first frame 101 through the signal connection part 185*b*, which is in contact with the auxiliary board 183 positioned on the second frame 102 and connects the second frame 102 and the first frame 101.

As shown in FIG. 15(*b*), when a flexible substrate 184 connected to the conductive members 1024*a* is used, the flexible substrate 184 may be connected to the extension portion 1024*e* of the edge frame 1024 located in the third direction of the second frame 102 and also extend to the auxiliary board 183 located within the second frame 102 because the display unit 151 wraps around the first direction end portion.

The configuration that connects the auxiliary board 183 and the conductive members 1024*a* using the flexible substrate 184 has the following problems: it is difficult to separate the display unit 151 when the display unit 151 is combined; and the display unit 151 may be damaged during assembly or repair.

To locate the microphone hole 122*h* at the center of the mobile terminal 100 in the first direction and facilitate the connection between the auxiliary board 183 located inside the edge frame 1024 and the second frame 102, the structure of the edge frame 1024 may be improved.

Figure 16:
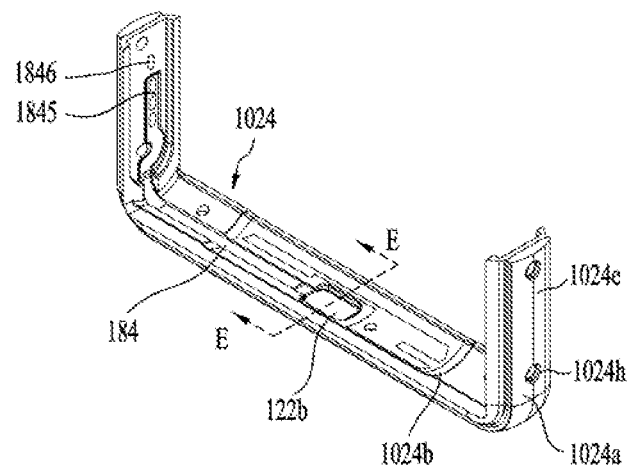
FIG. 16(a) shows an inner surface of an edge frame where a microphone module and a flexible substrate are located.
FIG. 16(b) is a cross-sectional view taken along line E-E of FIG. 16(a).
Figure 16:
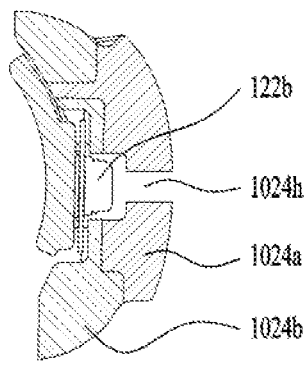
Figure 17:
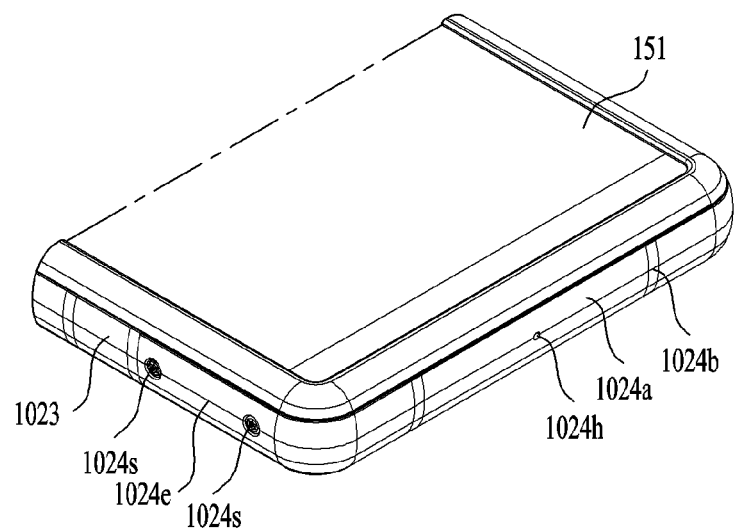
FIG. 17(a) shows a state in which an edge frame is fastened to a second frame.
FIG. 17(b) shows the second frame of FIG. 17(a) without the edge frame.
Figure 17:
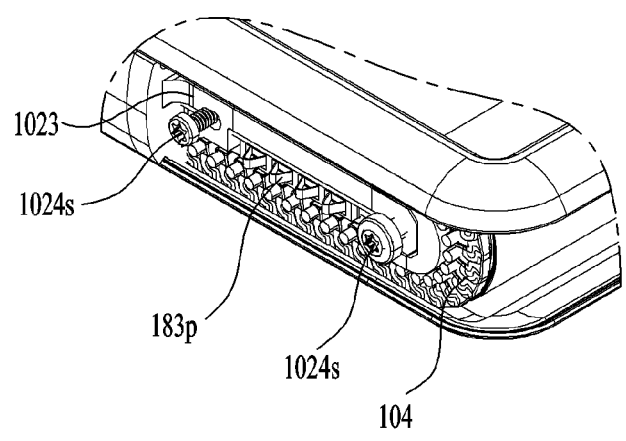

FIGS. 16 and 17 are views showing an improved edge frame 1024. FIG. 16(*a*) shows the inner surface of the edge frame 1024 where the microphone module 122*b* and flexible substrate 184 are located, and FIG. 16(*b*) is a cross-sectional view taken along line E-E of FIG. 16(*a*). FIG. 17(*a*) shows a state in which the edge frame 1024 is fastened to the second frame 102, and FIG. 17(*b*) shows the second frame 102 of FIG. 17(*a*) without the edge frame 1024.

Referring to FIG. 16, the microphone module 122*b* may be positioned on the inner surface of the edge frame 1024. The microphone module 122*b* may be positioned inside the edge frame 1024, and the microphone hole 122*h* may be formed on the edge frame 1024 to collect sound through the microphone module 122*b*.

The microphone hole 122*h* may be formed on the edge frame 1024 as shown in FIG. 16(*b*), or the microphone hole 122*h* may be positioned between two adjacent components as illustrated in the example of FIG. 14. For example, a hole may be formed between the conductive member 1024*a* and the non-conductive member 1024*b*.

As shown in FIGS. 16(*a*) and 16(*b*), the microphone module 122*b* may be positioned inside the edge frame 1024 such that the microphone hole 122*h* is located at the bottom center of the terminal 100. This configuration does not require multiple microphone modules as described above and resolves the following problem: the quality of the voice collected by the microphone module 122*b* is degraded when the microphone hole 122*h* is covered by the user's hand.

In this embodiment, the display unit 151 is positioned facing the inner surface of the edge frame 1024 as described above. To connect the microphone and auxiliary board 183, it is difficult to directly extend the flexible substrate 184 from the microphone module 122*b* in the second direction. However, the flexible substrate 184 may extend from the microphone module 122*b* along the inner surface of the edge frame 1024 in the microphone module 122*b* to connect with the auxiliary board 183 in the third direction as shown in FIG. 16(*a*).

One end of the flexible substrate 184 is positioned on the inner surface of the edge frame 1024 such that the other end of the microphone module 122*b* is positioned in the extension portion 1024*e* of the edge frame 1024. A connection terminal 1845 connected to the auxiliary board 183 may be provided at the other end of the flexible substrate 184.

As shown in FIG. 9, the auxiliary board 183, which is positioned adjacent to the third direction side portion 1023 of the second frame 102, is located slightly away from (slightly above) the first direction end portion to accommodate the display unit 151 that warps around the bottom. To enable direct connection with the auxiliary board 183 in the third direction via a connecting pin 183*p*, the extension portion 1024*e* of the edge frame 1024 extends in the second direction. This may ensure a sufficient space for the connection between the auxiliary board 183 and the flexible substrate 184 of the microphone module 122*b*.

As shown in FIG. 17(*b*), the connection pin 183*p* may be positioned on the auxiliary board 183 that overlaps with the extension portion 1024*e* of the edge frame 1024. A plurality of connection pins 183*p* may be included for the microphone.

Since the extension portion 1024*e* needs to overlap with a portion where the plurality of connection pins 183*p* are located, the length of the extension portion 1024*e* becomes longer. The extension portion 1024*e* of the edge frame 1024 according to this embodiment becomes longer in the third and fourth directions compared to that of the embodiments shown in FIGS. 14 and 15. It also allows for the placement of fastening structures at multiple locations to secure the second frame 102. In addition, fasteners for fastening the second frame 102 may located at a plurality of positions.

In the embodiments shown in FIGS. 14 and 15, the screw 1024*s* is provided at one location. However, when the extension portion 1024*e* and the second frame 102 are fastened at only one location, the edge frame 1024 may rotate around the fastening point, i.e., the screw 1024*s*. In particular, when the length of the extension portion 1024*e* of the edge frame 1024 becomes longer as shown in FIG. 16, additional reinforcement may be required to enhance the fastening force, and thus, the number of screws 1024*s* may increase.

To maintain the connection between the connecting pins 183*p* and the flexible substrate 184 positioned on the inner surface of the edge frame 1024, the screws 1024*s* may be used to fasten the extension portion 1024*e* of the edge frame 1024 and the side portion 1023 of the second frame 102 on both sides of the connecting pins 183*p*.

The conductive members 1024*a* of the edge frame 1024, which are used as an antenna, may also be connected to the auxiliary board 183 through the connecting pins 183*p* shown in FIG. 17(b). The non-conductive members 1024b, which form the inner surface of the edge frame 1024, may include connection holes disposed in the extension portion 1024e to expose connection portions 1846 (see FIG. 16(a)) of the conductive members 1024a.

The connection portions 1846 of the conductive members 1024a may be arranged in parallel with connection portions 1845 of the flexible substrate 184 of the microphone module 122b. The connection portions 1846 of the conductive members 1024a may be connected to the connecting pins 183p, which are arranged in parallel as shown in FIG. 17(b).

As described above, the mobile terminal according to an embodiment of the present disclosure may extend the display unit and maintain a flat state without sagging.

In addition, the internal components are distributed rather than concentrated on one side as the mobile terminal extends, thereby minimizing shifts in the center of gravity. In other words, since the center of gravity does not shift upward, the user may use the mobile terminal stably even when the mobile terminal extends.

Since the microphone may be positioned at the bottom center of the terminal, it is possible to solve the problem that the microphone hole is covered when the user holds the mobile terminal.

Further, the bottom of the mobile terminal may be used to implement an antenna, thereby increasing the utilization of limited space.

The mobile terminal 100 according to an embodiment of the present disclosure has been described as a specific embodiment. However, the embodiment is merely exemplary, and thus the present disclosure is not limited thereto. In other words, the scope of the present disclosure should be interpreted to encompass the broadest range consistent with the principles disclosed in this specification. The skilled person may implement unmentioned embodiments by combining or substituting the embodiments disclosed herein. However, such variations are still within the scope of the present disclosure. In addition, it is apparent that the skilled person may easily modify or adapt the embodiments disclosed in this specification, and the modifications or adaptations are also within the scope of the present disclosure.

The invention claimed is:

1. A mobile terminal with a variable size, the mobile terminal comprising:
    a first frame;
    a second frame having mounted thereon a substrate and configured to move with respect to the first frame in a first direction or second direction opposite to the first direction;
    a display unit comprising a curved portion configured to wrap around a first end of the second frame, wherein the first end is positioned toward the first direction;
    an edge frame coupled to the second frame and comprising a microphone hole, wherein the edge frame is configured to cover the curved portion;
    a microphone module disposed at an inner surface of the edge frame and configured to receive sound through the microphone hole; and
    a flexible substrate positioned at the inner surface of the edge frame and provided with a connection terminal at a first end of the flexible substrate,
    wherein the connection terminal is coupled to the substrate and a second end of the flexible substrate is coupled to the microphone module.

2. The mobile terminal of claim 1, wherein the first frame is positioned toward a top of the mobile terminal with respect to the second frame, and
    wherein the first direction is toward a bottom of the mobile terminal.

3. The mobile terminal of claim 1,
    wherein the edge frame comprises an extension portion covering at least a portion of a side portion of the second frame, and
    wherein the extension portion and the side portion are fastened together by a screw.

4. The mobile terminal of claim 3, wherein the substrate comprises a microphone connection pin disposed inside the second frame adjacent to the side portion and facing a third direction perpendicular to the first direction, and
    wherein the connection terminal of the flexible substrate is in contact with the microphone connection pin.

5. The mobile terminal of claim 3, wherein the edge frame comprises a conductive member including a conductive material, and
    wherein the substrate further comprises an antenna connection pin in contact with the conductive member.

6. The mobile terminal of claim 5, wherein the edge frame comprises a non-conductive member at an inner side of the conductive member, and
    wherein the non-conductive member further comprises a connection hole at the extension portion of the edge frame and configured to inwardly expose the conductive member therethrough.

7. The mobile terminal of claim 6, wherein the antenna connection pin is disposed on the substrate adjacent to the microphone connection pin in contact with the connection terminal.

8. The mobile terminal of claim 7, wherein the extension portion and the side portion are fastened together by a pair of screws spaced apart in the first direction, and
    wherein the antenna connection pin and the microphone connection pin are positioned between the pair of screws.

* * * * *